United States Patent
Bessant et al.

(10) Patent No.: US 10,952,473 B2
(45) Date of Patent: *Mar. 23, 2021

(54) AEROSOL-GENERATING SYSTEM WITH PAIRS OF ELECTRODES

(71) Applicant: Altria Client Services LLC, Richmond, VA (US)

(72) Inventors: Michel Bessant, Carouge (CH); Robert Emmett, Neuchatel (CH); Jacques Robert, Le Mont-sur-Lausanne (CH)

(73) Assignee: Altria Client Services LLC, Richmond, VA (US)

( * ) Notice: Subject to any disclaimer, the term of this patent is extended or adjusted under 35 U.S.C. 154(b) by 204 days.

This patent is subject to a terminal disclaimer.

(21) Appl. No.: 15/850,278

(22) Filed: Dec. 21, 2017

(65) Prior Publication Data
US 2018/0177238 A1   Jun. 28, 2018

Related U.S. Application Data

(63) Continuation of application No. PCT/EP2017/083386, filed on Dec. 18, 2017.

(51) Int. Cl.
*A24F 47/00* (2020.01)
*G01F 23/02* (2006.01)
(Continued)

(52) U.S. Cl.
CPC .............. *A24F 47/008* (2013.01); *G01C 9/18* (2013.01); *G01F 23/02* (2013.01); *G01F 23/263* (2013.01)

(58) Field of Classification Search
CPC ......... A24F 47/008; G01C 9/18; G01F 23/02; G01F 23/263
(Continued)

(56) References Cited

U.S. PATENT DOCUMENTS

| 4,417,473 A | 11/1983 | Tward et al. |
| 5,083,383 A | 1/1992 | Heger |

(Continued)

FOREIGN PATENT DOCUMENTS

| DE | 19645970 A1 | 5/1998 |
| EP | 2468116 A1 | 6/2012 |

(Continued)

OTHER PUBLICATIONS

International Preliminary Report and Written Opinion for corresponding PCT Application No. PCT/EP2017/083386 dated Jul. 4, 2019.

(Continued)

*Primary Examiner* — Dana Ross
*Assistant Examiner* — Ket D Dang
(74) *Attorney, Agent, or Firm* — Harness, Dickey & Pierce, P.L.C.

(57) ABSTRACT

An aerosol-generating system includes a liquid storage for holding a liquid aerosol-forming substrate, a first pair of electrodes, a second pair of electrodes and a control system. The liquid storage includes a first portion in fluid communication with a second portion. The first pair of electrodes is adjacent to or in the first portion of the liquid storage. The second pair of electrodes is adjacent to or in the second portion of the liquid storage portion. The control system is configured to measure an electrical quantity between the first pair of electrodes, measure an electrical quantity between the second pair of electrodes, and determine the orientation of the liquid storage portion based on the electrical quantity between the first pair of electrodes and the electrical quantity between the second pair of electrodes.

18 Claims, 10 Drawing Sheets

(51) Int. Cl.
*G01F 23/26* (2006.01)
*G01C 9/18* (2006.01)

(58) Field of Classification Search
USPC ....... 392/390, 387, 386, 394, 398, 401, 404,
392/441, 444, 447, 497, 502; 219/601,
219/607, 609, 611, 624, 628, 629, 630,
219/634, 635, 643, 644, 675; 131/328,
131/329, 330
See application file for complete search history.

(56) References Cited

U.S. PATENT DOCUMENTS

| | | | |
|---|---|---|---|
| 5,095,921 A | | 3/1992 | Losee et al. |
| 5,530,225 A | | 6/1996 | Hajaligol |
| 6,474,156 B1 | | 11/2002 | Endo et al. |
| 2004/0029366 A1* | | 2/2004 | Jakoby ................ G01F 23/0092 438/496 |
| 2011/0083504 A1 | | 4/2011 | Unger |
| 2011/0113878 A1 | | 5/2011 | Ohshima et al. |
| 2013/0319435 A1* | | 12/2013 | Flick .................... A61M 11/042 131/328 |
| 2014/0000638 A1* | | 1/2014 | Sebastian .............. A24F 47/008 131/328 |
| 2014/0352428 A1* | | 12/2014 | Kato ..................... G01F 23/268 |
| 2015/0122015 A1 | | 5/2015 | Leppard |
| 2015/0235546 A1 | | 8/2015 | Stapleford |
| 2015/0257445 A1 | | 9/2015 | Henry, Jr. et al. |
| 2015/0366266 A1* | | 12/2015 | Chen .................... A61M 15/06 131/328 |
| 2016/0025545 A1 | | 1/2016 | Saltzgiver et al. |
| 2016/0029698 A1 | | 2/2016 | Xiang |
| 2016/0235122 A1* | | 8/2016 | Krietznnan .......... H05B 1/0225 |
| 2016/0310684 A1* | | 10/2016 | McCullough .......... A61K 36/38 |
| 2016/0345628 A1* | | 12/2016 | Sabet ................ H04M 1/72527 |
| 2017/0245552 A1* | | 8/2017 | Reevell ................. A24F 47/008 |
| 2018/0049469 A1 | | 2/2018 | Kaufman et al. |
| 2018/0242644 A1* | | 8/2018 | Bessant ................... H05B 3/20 |

FOREIGN PATENT DOCUMENTS

| | | |
|---|---|---|
| EP | 2756859 A1 | 7/2014 |
| GB | 2533652 A | 6/2016 |
| WO | WO-2015/177046 A1 | 11/2015 |
| WO | WO-2017137505 A1 | 8/2017 |
| WO | WO-2018/114849 A1 | 6/2018 |

OTHER PUBLICATIONS

Extended European Search Report #16206381.2 dated Jun. 9, 2017.
Jacques Robert et al, "A Second-Order High-Resolution Incremental A/D Converter with Offset and Charge Injection Compensation", IEEE Journal of Solid-State Circuits, vol. 23, No. 3, Jun. 1988, pp. 736-741.
Alexander V. Mamishev et al, "Interdigital Sensors and Transducers", Proceedings of the IEEE, vol. 92, No. 5, May 2004, pp. 808-845.
David Wang, "TI Designs: Capacitive-Based Liquid Level Sensing Sensor Reference Design", Texas Instruments Incorporated, Jan. 2015, pp. 1-23.
U.S. Office Action dated Nov. 6, 2020 issued in co-pending U.S. Appl. No. 15/908,074.
Extended European Search Report #17158521.9 dated Sep. 13, 2017.
International Preliminary Report on Patentability for International Application No. PCT/EP2018/053725 dated Sep. 12, 2019.
U.S. Office Action dated May 22, 2020 issued in co-pending U.S. Appl. No. 15/908,074.
International Search Report and Written Opinion for International Application No. PCT/EP2018/053725 dated May 18, 2018.
European Office Action dated Oct. 8, 2020 issued in corresponding European Patent Application No. 18 705 147.9-1004.
U.S. Appl. No. 15/908,074, filed Feb. 28, 2018.
U.S. Notice of Allowance dated Jan. 28, 2021 issued in co-pending U.S. Appl. No. 15/908,074.

* cited by examiner

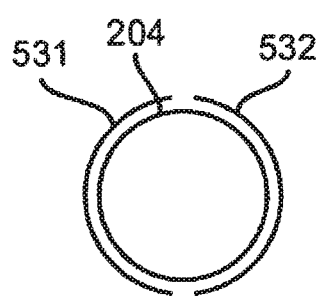 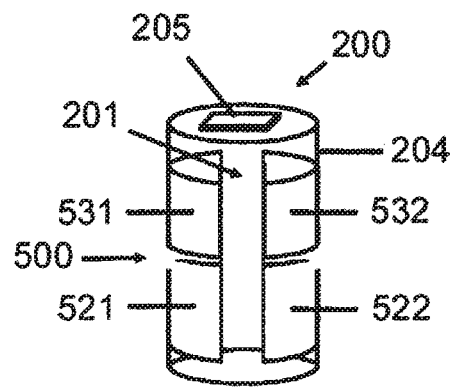
Figure 11a  Figure 11b
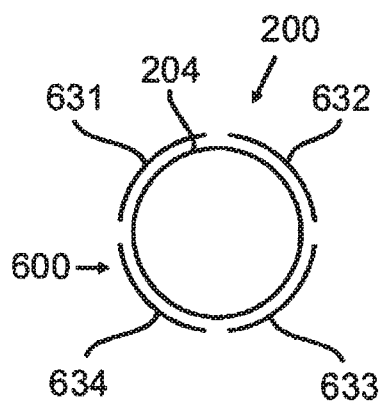 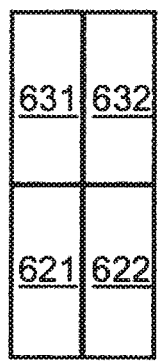 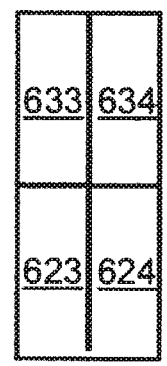
Figure 12a  Figure 12b  Figure 12c

AEROSOL-GENERATING SYSTEM WITH PAIRS OF ELECTRODES

CROSS-REFERENCE TO RELATED APPLICATIONS

This application is a continuation of International Patent Application No. PCT/EP2017/083386, filed Dec. 18, 2017, and claims priority under 35 U.S.C. § 119 to European Patent Application No. 16206381.2, filed on Dec. 22, 2016, the entire contents of each of which are incorporated herein by reference.

BACKGROUND

Field

Example embodiments relate to electrically operated aerosol-generating systems and cartridges for electrically operated aerosol-generating systems.

Description of Related Art

Electrically operated aerosol-generating systems may typically comprise a liquid aerosol-forming substrate, which is atomised to form an aerosol. Electrically operated aerosol-generating systems often comprise a power supply, a liquid-storage portion for holding a supply of liquid aerosol-forming substrate and an atomiser. A type of atomiser used in such systems comprises a coil of heater wire wound around an elongate wick soaked in liquid aerosol-forming substrate. Another type of atomiser used in such systems comprises a heating mesh.

SUMMARY

According to an example embodiment, there is provided an aerosol-generating system comprising a liquid storage configured to hold a liquid aerosol-forming substrate, the liquid storage including a first portion in fluid communication with a second portion, a first pair of electrodes adjacent to, or in the first portion of, the liquid storage, a second pair of electrodes adjacent to, or in the second portion of, the liquid storage, and a control system. The control system is configured to measure an electrical quantity between the first pair of electrodes, measure an electrical quantity between the second pair of electrodes, and determine an orientation of the liquid storage based on the measurements of the electrical quantity between the first pair of electrodes and the electrical quantity between the second pair of electrodes.

The control system may be configured to determine the orientation of the liquid storage based on a comparison between the electrical quantity between the first pair of electrodes and the electrical quantity between the second pair of electrodes.

The control system may be configured to determine an amount of the liquid aerosol-forming substrate held in the liquid storage based on the electrical quantity between the first pair of electrodes, the electrical quantity between the second pair of electrodes, and the determined orientation of the liquid storage.

The control system may be configured to compare the determined orientation of the liquid storage to one or more reference orientation values, and in response to the determined orientation of the liquid storage matching a reference orientation value, determine an amount of the liquid aerosol-forming substrate held in the liquid storage based on measurements of the electrical quantity between the first pair of electrodes and measurements of the electrical quantity between the second pair of electrodes.

The control system may be configured to control system is configured to determine whether the liquid storage is at a horizontal orientation.

The first portion of the liquid storage may have a length and the first pair of electrodes extends substantially the length of the first portion of the liquid storage, and the second portion of the liquid storage may have a length and the second pair of electrodes extends substantially the length of the second portion of the liquid storage.

The first portion of the liquid storage may have a uniform cross-section along the length of the first portion, and the second portion of the liquid storage may have a uniform cross-section along the length of the second portion.

The first portion of the liquid storage may comprise a first half of the liquid storage and the second portion of the liquid storage may comprise a second half of the liquid storage.

At least one of the first pair of electrodes may be arranged such that at least a part of the first portion of the liquid storage is arranged between the first pair of electrodes, and the second pair of electrodes are arranged such that at least a part of the second portion of the liquid storage is arranged between the second pair of electrodes.

At least one of the first pair of electrodes are interdigitated electrodes, and the second pair of electrodes are interdigitated electrodes.

The first pair of electrodes may be configured to form a first capacitor and the electrical quantity to be measured between the first pair of electrodes is a first capacitance, and the second pair of electrodes may be configured to form a second capacitor and the electrical quantity to be measured between the second pair of electrodes is a second capacitance.

According to an example embodiment, there is provided an aerosol-generating system comprising two or more first pairs of electrodes arranged to or in a first portion of a liquid storage, and two or more second pairs of electrodes arranged to or in a second portion of the liquid storage. The control system is configured to measure an electrical quantity between each first pair of electrodes, measure an electrical quantity between each second pair of electrodes, and determine the orientation of the liquid storage based on the measurements of the electrical quantity between the first pairs of electrodes and the measurements of the electrical quantity between the second pairs of electrodes.

The first pair of electrodes may be configured to form a first capacitor and the electrical quantity to be measured between the first pair of electrodes is a first capacitance, and the second pair of electrodes may be configured to form a second capacitor and the electrical quantity to be measured between the second pair of electrodes is a second capacitance.

The aerosol-generating system may further comprise a cartridge comprising the liquid storage, and a main unit comprising the control system and a cavity configured to receive the cartridge. The first pair of electrodes and the second pair of electrodes are in the cartridge or in the cavity of the main unit.

The aerosol-generating system may further comprise a main unit, wherein the main unit includes, the control system, and a cavity configured to receive a cartridge. The first pair of electrodes are at a first portion of the cavity such that the first portion of the liquid storage is adjacent to the first pair of electrodes when the cartridge is in the cavity, and the second pair of electrodes are at a second portion of the cavity such that the second portion of the liquid storage of the cartridge is adjacent to the second pair of electrodes when the cartridge is in the cavity.

The electrical quantity between the first pair of electrodes may be a first capacitance, and the electrical quantity between the second pair of electrodes may be a second capacitance.

The aerosol-generating system may comprise a cartridge, wherein the cartridge includes, the liquid storage having the first and second portions, the first pair of electrodes adjacent to or in the first portion of the liquid storage, and the second pair of electrodes adjacent to or in the second portion of the liquid storage.

According to an example embodiment, a method of determining an orientation of a liquid storage of an aerosol-generating system comprises measuring an electrical quantity between a first pair of electrodes adjacent to or in a first portion of the liquid storage, measuring an electrical quantity between a second pair of electrodes adjacent to or in a second portion of the liquid storage, the first portion of the liquid storage being in fluid communication with the second portion of the liquid storage; and determining the orientation of the liquid storage based on the electrical quantity between the first pair of electrodes and the electrical quantity between the second pair of electrodes.

BRIEF DESCRIPTION OF THE DRAWINGS

Example embodiments will be further described, by way of example only, with reference to the accompanying drawings, in which:

FIGS. 11a and 11b show a plan view and a perspective view respectively of a further example embodiment of a cartridge that is suitable for use in the aerosol-generating system of FIG. 1;

FIGS. 12a, 12b and 12c show a plan view, a schematic front illustration and a schematic back illustration respectively of a further example embodiment of a cartridge that is suitable for use in the aerosol-generating system of FIG. 1;

DETAILED DESCRIPTION

Figure 1:
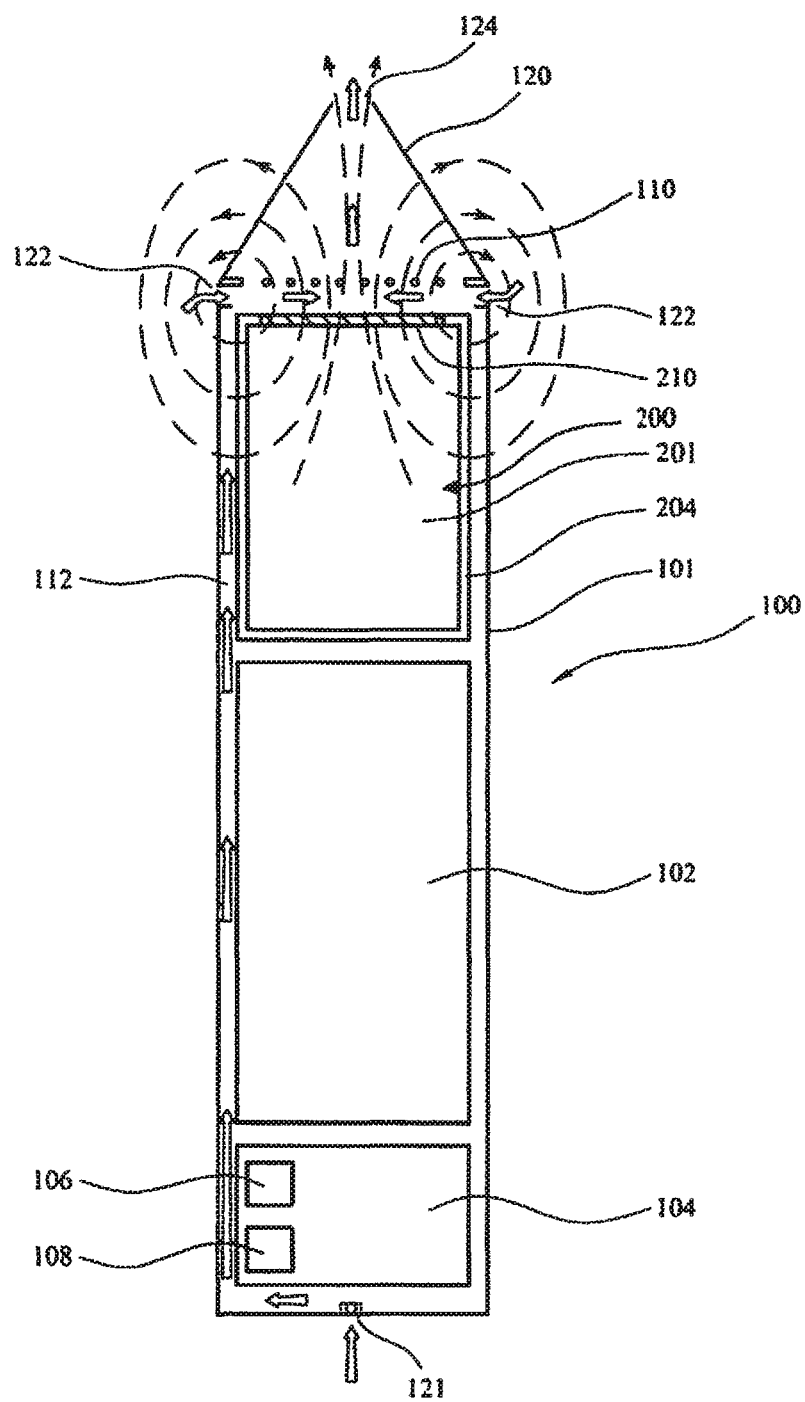
FIG. 1 shows a schematic illustration of an exemplary aerosol-generating system according to example embodiments.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

In the following description, illustrative embodiments may be described with reference to acts and symbolic representations of operations (e.g., in the form of flow charts, flow diagrams, data flow diagrams, structure diagrams, block diagrams, etc.) that may be implemented as program modules or functional processes including routines, programs, objects, components, data structures, etc., that perform particular tasks or implement particular abstract data types. The operations be implemented using existing hardware in existing electronic systems, such as one or more microprocessors, Central Processing Units (CPUs), digital signal processors (DSPs), application-specific-integrated-circuits (ASICs), Systems on Chip (SoCs), field programmable gate arrays (FPGAs), computers, or the like.

One or more example embodiments may be (or include) hardware, firmware, hardware executing software, or any combination thereof. Such hardware may include one or more microprocessors, CPUs, SoCs, DSPs, ASICs, FPGAs, computers, or the like, configured as special purpose machines to perform the functions described herein as well as any other well-known functions of these elements. In at least some cases, CPUs, SoCs, DSPs, ASICs and FPGAs may generally be referred to as controllers, processing circuits, processors and/or microprocessors.

Although processes may be described with regard to sequential operations, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium", "computer readable storage medium" or "non-transitory computer readable storage medium," may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, at least some portions of example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, processor(s), processing circuit(s), or processing unit(s) may be programmed to perform the necessary tasks, thereby being transformed into special purpose processor(s) or computer(s).

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

Liquid aerosol-forming substrate is consumed during use of an aerosol-generating system and often requires replacing, either by refilling a liquid storage portion or by replacing a cartridge comprising a liquid storage portion.

An aerosol-generating system to provide a user with an accurate determination of the amount of liquid aerosol-forming substrate held in a liquid storage portion may be desirable. An aerosol-generating system to accurately monitor the amount of liquid aerosol-forming substrate that is held in the liquid storage portion may be desirable.

In an example embodiment, there is provided an aerosol-generating system comprising: a liquid storage portion for holding a liquid aerosol-forming substrate, the liquid storage portion comprising: a first portion in fluid communication with a second portion; a first pair of electrodes adjacent to or in the first portion of the liquid storage portion; a second pair of electrodes adjacent to or in the second portion of the liquid storage portion; and a control system. The control system is configured to measure an electrical quantity between the first pair of electrodes, measure an electrical quantity between the second pair of electrodes, and determine the orientation of the liquid storage portion based on measurements of the electrical quantity between the first pair of electrodes and measurements of the electrical quantity between the second pair of electrodes.

In use, when the liquid storage portion is neither full of liquid aerosol-forming substrate nor empty of liquid aerosol-forming substrate, the amount of liquid aerosol-forming substrate held in a first portion of the liquid storage portion and the amount of liquid aerosol-forming substrate held in a second portion of the liquid storage portion may vary with the orientation of the liquid storage portion. A liquid aerosol-forming substrate held in the liquid storage portion may move, under the influence of gravity, between the first and second portions of the liquid storage portion when the liquid storage portion is tilted or inclined. Such movement of the liquid aerosol-forming substrate between the first and second portions of the liquid storage portion may vary the electrical properties of the first and second portions of the liquid storage portion. As a result, measurements of electrical quantities between the first and second pairs of electrodes may vary when the liquid storage portion is tilted or inclined. Thus, the control system of the aerosol-generating system of example embodiments may determine the orientation of the liquid storage portion using electrical quantity measurements from the first and second pairs of electrodes.

Providing an aerosol-generating system with means for determining the orientation of the liquid storage portion is desirable for several reasons. In particular, the accuracy and reliability of estimates of the amount of liquid aerosol-forming substrate held in a liquid storage portion may be improved if the estimate is made when the liquid storage portion is at a particular orientation, as described in more detail below. In addition, some aerosol-generating systems may generate an improved aerosol when the liquid storage portion is at a particular orientation, such as when the liquid storage portion is substantially horizontal. In these systems, the aerosol-generating system may indicate to the user when the system is at an improved, e.g. the optimum orientation, for aerosol-generation may be desirable.

Determining the orientation of the liquid storage portion from measurements of an electrical property of different portions of the liquid storage portion may be particularly desirable, as the measurements of the electrical quantities of portions of the liquid storage portion may be used to monitor multiple other aspects of the liquid storage portion in addition to the orientation. Further aspects of the liquid storage portion that may be determined from measurements of electrical properties of the liquid storage portion, may include the amount of liquid aerosol-forming substrate held in the liquid storage portion, the identity or authenticity of the liquid aerosol-forming substrate held in the liquid storage portion, and whether a user is using the aerosol-generating system. The pairs of electrodes of example embodiments enable the aerosol-generating system to determine the orientation of the liquid storage portion without requiring a separate tilt sensor, such as an accelerometer, to be provided in the system.

As used herein with reference to example embodiments, the term 'orientation' is used to describe the inclination, tilt or angle of the liquid storage portion. The determined orientation of the liquid storage portion may comprise an absolute value or a relative value. The determined orientation may comprise an angle, such as a value in degrees or radians. The determined orientation comprise an indication of whether the liquid storage portion is at one or more particular orientations or inclinations. The determined orientation may comprise an indication of whether the liquid storage portion is not at the one or more particular orientations or inclinations. In some example embodiments, the control system may be configured to determine whether the liquid storage portion is at a horizontal orientation and whether the liquid storage portion is not at a horizontal orientation. In some example embodiments, the control system may be configured to determine whether the liquid storage portion is at a horizontal orientation, whether the liquid storage portion is at a vertical orientation and whether the liquid storage portion is neither at a horizontal orientation nor a vertical orientation.

As used herein with reference to example embodiments, the term 'adjacent to or in' is meant to include terms such as: next to, close to, in close proximity to, on, within and inside. For example, where the liquid storage portion comprises a container having walls, the first and second pairs of electrodes may be considered to be 'adjacent to or in' the liquid storage portion when they are arranged next to or neighbouring the walls of the container, when they abut or contact an outer surface of the walls of the container, when they are secured to or applied to an outer surface of the walls of the container, when they are secured to or applied to an inner surface of the walls, when they form an integral part of the walls of the container and when they are within or inside the container.

The first pair of electrodes may be arranged relative to the first portion of the liquid storage portion such that the first pair of electrodes sense electrical properties of the first portion. That is, the first pair of electrodes may be arranged in electrical proximity to the first portion of the liquid storage portion. The first pair of electrodes may be arranged to sense changes in the electrical properties of the first portion of the liquid storage portion, which may occur as a result of a change in the amount of liquid aerosol-forming substrate held in the first portion.

Similarly, the second pair of electrodes may be arranged relative to the second portion of the liquid storage portion such that the second pair of electrodes sense electrical properties of the second portion. For example, the second pair of electrodes may be arranged in electrical proximity to the second portion of the liquid storage portion. The second pair of electrodes may be arranged to sense changes in the electrical properties of the second portion of the liquid storage portion, which may occur as a result of a change in the amount of liquid aerosol-forming substrate held in the second portion.

As used herein with reference to example embodiments, the term 'electrical quantity' is used to describe any electrical property, parameter or attribute that can be quantified by measurement. For example, suitable 'electrical quantities' may include current, voltage, impedance, capacitance and/or resistance. The control system may be configured to measure at least one of impedance, capacitance and/or resistance between the first pair of electrodes and the second pair of electrodes.

The liquid storage portion may comprise an electrical load. The liquid storage portion may comprise at least one of a resistive load and a capacitive load. Advantageously, electrical quantities of resistive and capacitive loads may be measured without requiring complex electronics.

The liquid storage portion may be configured to hold both a liquid aerosol-forming substrate and air. The liquid aerosol-forming substrate may have substantially different electrical properties from air. The electrical properties of the first and second portions of the liquid storage portion may depend on the amount of liquid aerosol-forming substrate and the amount of air held in the liquid storage portion. The liquid storage portion may also comprise one or more carrier materials for holding the liquid aerosol-forming substrate, and a housing for holding the liquid aerosol-forming substrate. The liquid aerosol-forming substrate, air, carrier material, and housing may have different electrical properties, e.g. different electrical properties from one another.

The electrical properties of the liquid storage portion may change during use as the ratio of liquid aerosol-forming substrate to air held in the liquid storage portion changes. When the liquid storage portion is filled with liquid aerosol-forming substrate, the liquid storage portion may hold predominantly liquid aerosol-forming substrate. In use, liquid aerosol-forming substrate may be consumed from the liquid storage portion and replaced with air. When the liquid storage portion is empty, the liquid storage portion may hold predominantly air. Where the liquid storage portion comprises a carrier material, the liquid storage portion may hold a combination of liquid aerosol-forming substrate, air and the carrier material. The liquid storage portion may be refilled, replacing air in the liquid storage portion with liquid aerosol-forming substrate.

In some example embodiments, the control system may be configured to determine the orientation of the liquid storage portion based on a comparison between the electrical quantity measured between the first pair of electrodes and the electrical quantity measured between the second pair of electrodes. For example, the control system may be configured to determine the orientation of the liquid storage portion based on the ratio of the measured electrical quantity of the first portion to the measured electrical quantity of the second portion. In another example, the control system may be configured to determine the orientation of the liquid storage portion based on the difference between the measured electrical quantity of the first portion and the measured electrical quantity of the second portion.

The control system may be configured to determine the orientation of the liquid storage portion based on a comparison of the electrical quantity measured between the first pair of electrodes to one or more first reference values stored in the control system and a comparison of the electrical quantity measured between the second pair of electrodes to one or more second reference values stored in the control system. The control system may be configured to determine the orientation of the liquid storage portion based on a combination of these comparisons.

In some example embodiments, the control system may be configured to store a first large, e.g. maximum, reference value, corresponding to the electrical quantity measured between the first pair of electrodes when the first portion of the liquid storage portion is full of liquid aerosol-forming substrate, and a second large, e.g. maximum, reference value, corresponding to the electrical quantity measured between the second pair of electrodes when the second portion of the liquid storage portion is full of liquid aerosol-forming substrate. The control system may also be configured to store a first small, e.g. minimum, reference value, corresponding to the electrical quantity measured between the first pair of electrodes when the first portion of the liquid storage portion is empty of liquid aerosol-forming substrate, and a second small, e.g. minimum, reference value, corresponding to the electrical quantity measured between the second pair of electrodes when the second portion of the liquid storage portion is empty of liquid aerosol-forming substrate.

The control system may be configured to compare the electrical quantity measured between the first pair of electrodes with at least one of the first maximum and minimum reference values and to compare the electrical quantity measured between the second pair of electrodes with at least one of the second maximum and minimum reference values. The control system may be configured to determine that the liquid storage portion is full of liquid aerosol-generating substrate when the electrical quantity measured between the first pair of electrodes is equal, or substantially equal, to the first maximum reference value and the electrical quantity measured between the second pair of electrodes is equal, or substantially equal, to the second maximum reference value. The control system may be configured to determine that the liquid storage portion is empty of liquid aerosol-generating substrate when the electrical quantity measured between the first pair of electrodes is equal, or substantially equal, to the first minimum reference value and the electrical quantity measured between the second pair of electrodes is equal, or substantially equal, to the second minimum reference value. The control system may not be able to determine the orientation from measurements between the first and second pairs of electrodes when the liquid storage portion is full or empty of liquid aerosol-forming substrate.

In some example embodiments, the first and second portions of the liquid storage portion may be identical, or substantially identical. The identical first and second portions may be arranged end-to-end along a common central longitudinal axis. In other words, the first and second portions may be symmetrical about a plane between the first and second portions that is normal to the common central longitudinal axis. This symmetry between the first and second portions about a plane normal to the longitudinal axis may enable the system to determine whether the liquid storage portion is at a horizontal orientation, such that the common central longitudinal axis is arranged substantially horizontally. This may be because the amount of liquid aerosol-forming substrate held in the first and second portions may be substantially equal when the liquid storage portion is at a horizontal orientation.

In these example embodiments, the first and second pairs of electrodes may also be identical, or substantially identical, and arranged in identical configurations relative to their respective portions of the liquid storage portion. As such, the electrical quantities measured between the first and second pairs of electrodes may be substantially equal when the amounts of liquid aerosol-forming substrate held in the first and second portions of the liquid storage portion are substantially equal.

Thus, in these example embodiments, the control system may be configured to determine that the liquid storage portion is at a horizontal orientation when the measurements between the first and second pair of electrodes are substantially equal.

The electrical quantities measured between the first and second pairs of electrodes may also be substantially equal when the liquid storage portion is substantially full or empty of liquid aerosol-forming substrate. Thus, the control system may be configured not to determine the orientation of the liquid storage portion if the electrical quantities measured between the first and second pairs of electrodes indicate that the liquid storage portion is full or empty of liquid aerosol-forming substrate.

The control system may be configured to determine the orientation of the liquid storage portion when the aerosol-generating system is switched on. The control system may be configured to determine the orientation of the liquid storage portion periodically at specific (or, alternatively, predetermined) intervals. Alternatively or additionally, the control system may be configured to determine orientation of the liquid storage portion when prompted by a user.

In some example embodiments, the control system may be configured to determine the amount of liquid aerosol-forming substrate held in the liquid storage portion based on measurements of the electrical quantity between the first pair of electrodes and measurements of the electrical quantity between the second pair of electrodes.

As used herein with reference to example embodiments, the term 'amount' is used to describe the mass, quantity or proportion of liquid aerosol-forming substrate held in the liquid storage portion. The determined amount of liquid aerosol-forming substrate held in the liquid storage portion may comprise an absolute or a relative value. The determined amount of liquid aerosol-forming substrate may comprise a volume, such as a value in litres. The determined amount of liquid aerosol-forming substrate held in the liquid storage portion may comprise a fraction or a percentage, for example, with 1 or 100% indicating a full liquid storage portion and 0 or 0% indicating an empty liquid storage portion.

In some example embodiments, the control system may be configured to determine the amount of liquid aerosol-forming substrate held in the liquid storage portion when the liquid storage portion is determined to be at one or more particular orientations or inclinations. This may be because the relationship 254 between the measured electrical quantity between the first and second pairs of electrodes may only be known for one or more particular orientations or inclinations. In one example embodiment, the control system may be configured to determine the amount of liquid aerosol-forming substrate held in the liquid storage portion when the liquid storage portion is determined to be substantially horizontal. In another example, the control system may be configured to determine the amount of liquid aerosol-forming substrate held in the liquid storage portion when the liquid storage portion is determined to be either substantially horizontal or substantially vertical. This may improve the accuracy and reliability of the determined amount value.

In particular, the control system may be configured to compare the electrical quantity measurements between the first and second pairs of electrodes to one or more reference orientation conditions stored in the control system. The one or more reference orientation conditions may correspond to one or more particular orientations or inclinations of the liquid storage portion. For example, one reference orientation condition may correspond to the liquid storage portion being at a horizontal orientation and another reference orientation condition may correspond to the liquid storage portion being at a vertical orientation. The control system may be further configured such that if the electrical quantity measurements between the first and second pairs of electrodes match one or more of the one or more reference orientation conditions, the control system may determine the amount of liquid aerosol-forming substrate held in the liquid storage portion based on measurements of the electrical quantity between the first pair of electrodes and measurements of the electrical quantity between the second pair of electrodes.

The one or more reference orientation conditions stored in the control system may include, for example the electrical quantities measured between the first and second pairs of electrodes being substantially equal; the electrical quantities measured between the first and second pairs of electrodes being below a maximum reference value and above a minimum reference value; the electrical quantity measured between one of the pairs of electrodes being substantially equal to a maximum reference value or a minimum reference value and the electrical quantity measured between the other pair of electrodes being substantially greater than the minimum reference value or substantially less than the maximum reference value; at least one of the electrical quantities measured between the first and second pairs of electrodes being above a specific (or, alternatively, predetermined) threshold; and a combination of the electrical quantities measured between the first and second pairs of electrodes being above a specific (or, alternatively, predetermined) threshold.

Each reference condition may indicate that the liquid storage portion is at a particular or desired orientation. The particular or desired orientation may be an orientation at which a determination of the amount of liquid aerosol-forming substrate held in the liquid storage portion may be made. The selection of appropriate reference conditions may depend on the geometries of the first and second portions of the liquid storage portion and the first and second pairs of electrodes.

For example, in the example embodiment described above, the control system may be configured to compare the electrical quantity measured between the first pair of electrodes to at least one of a first maximum reference electrical quantity and a first minimum reference electrical quantity and determine whether the measured electrical quantity is above the first minimum reference electrical quantity and below the first maximum reference electrical quantity; compare the electrical quantity measured between the second pair of electrodes to at least one of a second maximum reference electrical quantity and a second minimum reference electrical quantity and determine whether the measured electrical quantity is above the second minimum reference electrical quantity and below the second maximum reference electrical quantity; and compare the electrical quantity measured between the first pair of electrodes and the electrical quantity measured between the second pair of electrodes and determine whether the measured electrical quantities are substantially equal.

The comparisons between the measured electrical quantities and the reference maximum and minimum values may provide an indication of whether the liquid storage portion is full or empty of liquid aerosol-forming substrate. The comparison between the measured electrical quantities of the first and second pairs of electrodes may provide an indication of the orientation of the liquid storage portion. In these example embodiments, the liquid storage portion is determined to be at a horizontal orientation when the measured electrical quantities are substantially equal.

The control system may be further configured to determine the amount of liquid aerosol-forming substrate held in the liquid storage portion if: the electrical quantity measured between the first pair of electrodes is below the first maximum reference electrical quantity and above the first minimum reference electrical quantity; the electrical quantity measured between the second pair of electrodes is below the second maximum reference electrical quantity and above the second minimum reference electrical quantity; and the electrical quantities measured between the first and second pairs of electrodes are substantially equal. For example, the control system may be configured to determine the amount of liquid aerosol-forming substrate held in the liquid storage portion when the liquid storage portion is determined to be neither empty nor full of liquid aerosol-forming substrate and when the liquid storage portion is determined to be at a horizontal orientation.

In some example embodiments, the control system may be configured to determine the amount of liquid aerosol-forming substrate held in the first portion of the liquid storage portion based on measurements between the first pair of electrodes, and determine the amount of liquid aerosol-forming substrate held in the second portion of the liquid storage portion based on measurements between the second pair of electrodes. The control system may be further configured to combine the determined amount of liquid aerosol-forming substrate held in the first portion of the liquid storage portion with the determined amount of liquid aerosol-forming substrate held in the second portion of the liquid storage portion to determine the total amount of liquid aerosol-forming substrate held in the liquid storage portion.

In some example embodiments, the control system may be configured to determine the amount of liquid aerosol-forming substrate held in the liquid storage portion by combining the electrical quantities measured between the first and second pairs of electrodes.

In some example embodiments, the control system may be configured to combine the electrical quantity measured between the first pair of electrodes and the electrical quantity measured between the second pair of electrodes and determine the amount of liquid aerosol-forming substrate held in the liquid storage portion based on the combined electrical quantity value. In these example embodiments, the control system may be configured to combine the electrical quantities measured between the first and second pairs of electrodes as if the first and second pairs of electrodes form electrical components connected together in series or in parallel. For example, the control system may be configured to treat the first pair of electrodes as a first capacitor and the second pair of electrodes as a second capacitor and to combine the measured electrical quantities of the first and second capacitors as though the first and second capacitors were connected together in parallel.

In other example embodiments, the first and second pairs of electrodes may be connected together and the control system may be configured to measure a combined electrical quantity across both the first and second pairs of electrodes. For example, the first pair of electrodes may form a first capacitor, the second pair of electrodes may form a second capacitor and the first and second capacitors may be connected together in parallel. The control system may be configured to measure the combined capacitance of the first and second capacitors.

The first and second pairs of electrodes may be connected together via one or more switches, such that the first and second pairs of electrodes may be selectively connected and disconnected. The control system may be configured to measure the electrical quantity between the first pair of electrodes and the electrical quantity between the second pair of electrodes when the first and second pairs of electrodes are disconnected. The control system may be configured to measure the combined electrical quantity across the first and second pairs of electrodes when the first and second pairs of electrodes are connected. The control system may be configured to control the one or more switches between the first and second pairs of electrodes.

The control system may be configured to determine the amount of liquid aerosol-forming substrate held in the liquid storage portion by a calculation. The calculation may use the electrical quantity information measured between the first and second pairs of electrodes. Using the calculation to determine the amount of liquid aerosol-forming substrate held in the liquid storage portion may be advantageous, as the control system may not be required to store or retrieve historical measurement data to perform the determination.

The electrical quantities measured between the first and second pairs of electrodes may change in manner, e.g. a predictable manner, with the amount of liquid aerosol-forming substrate held in the liquid storage portion. The electrical quantities measured between the first pair of electrodes may change in manner, e.g. a predictable manner, with the amount of liquid aerosol-forming substrate held in the first portion of the liquid storage portion. The electrical quantities measured between the second pair of electrodes may change in manner, e.g. a predictable manner, with the amount of liquid aerosol-forming substrate held in the second portion of the liquid storage portion. In one example embodiment, the amount of liquid aerosol-forming substrate held in the first portion of the liquid storage portion may be substantially inversely proportional to the resistance measured by the control system between the first pair of electrodes. In another example, the amount of liquid aerosol-forming substrate held in the second portion of the liquid storage portion may be substantially proportional to the capacitance measured by the control system between the second pair of electrodes.

The control system may be configured to determine the amount of liquid aerosol-forming substrate held in the liquid storage portion by comparison. Using comparison to determine the amount of liquid aerosol-forming substrate held in the liquid storage portion may be advantageous, as the control system may be able to perform a comparison faster than a calculation. The control system may be configured to compare the electrical quantity information measured between the first pair of electrodes to reference electrical quantity information stored in the control system. The control system may also be configured to compare the electrical quantity information measured between the second pair of electrodes to reference electrical quantity information stored in the control system. The control system may be configured to combine the electrical quantity information measured between the first and second pairs of electrodes and to compare the combined measured electrical quantity information to reference electrical quantity information stored in the control system.

The reference electrical quantity information may be stored in a memory of the control system. The reference electrical quantity information may be or may include electrical quantity information measured by the control system and stored in a memory of the control system. The reference electrical quantity information may be associated with liquid aerosol-forming substrate amount information. This association between the reference electrical quantity information and liquid aerosol-forming substrate amount information may enable the determination of the amount of liquid aerosol-forming substrate held in the liquid storage portion to be reliable.

The reference electrical quantity information may comprise a plurality of ranges of reference electrical quantity information. Each range of the reference electrical quantity information may be associated with a liquid aerosol-forming substrate amount. The control system may be configured to compare measured electrical quantity information to the stored ranges of reference electrical quantity information, and to match the measured electrical quantity information to a stored range.

The reference electrical quantity information may be stored in a lookup table. The lookup table may comprise stored reference electrical quantity information and stored liquid aerosol-forming substrate amount information. The stored reference electrical quantity information may be associated with the stored liquid aerosol-forming substrate amount information. The stored liquid aerosol-forming substrate amount information may comprise one or more of volume information and fractional fill information.

In some example embodiments, the control system may be configured to determine the amount of liquid aerosol-forming substrate held in the liquid storage portion based on measurements of the electrical quantity between the first pair of electrodes, measurements of the electrical quantity between the second pair of electrodes, and the determined orientation of the liquid storage portion.

The electrical quantity measured between the first pair of electrodes may vary for a given amount of liquid aerosol-forming substrate held in the first portion of the liquid storage portion depending on the orientation of the liquid storage portion. Similarly, the electrical quantity measured between the second pair of electrodes may vary for a given amount of liquid aerosol-forming substrate held in the second portion of the liquid storage portion depending on the orientation of the liquid storage portion. Accordingly, the control system may be configured to account for the orientation of the liquid storage portion when determining the amount of liquid aerosol-forming substrate is held in the liquid storage portion. Where the amount of liquid aerosol-forming substrate is determined by calculation, the control system may be configured to normalize the measured electrical quantity information or transform the measured electrical quantity information by a mathematical function based on the determined orientation, or to add or subtract an offset value from the measured electrical quantity information based on the determined orientation. Where the amount of liquid aerosol-forming substrate is determined by comparison, the control system may associate stored reference electrical quantity information with stored reference orientation information. The control system may be configured to compare the determined orientation with the reference orientation information, and to compare the measured electrical quantity information with the reference electrical quantity information associated with the matched reference orientation information.

In some example embodiments, the control system may be configured to determine the amount of liquid aerosol-forming substrate held in the liquid storage portion when the aerosol-generating system is switched on. The control system may be configured to determine the amount of liquid aerosol-forming substrate held in the liquid storage portion periodically at specific (or, alternatively, predetermined) intervals. Alternatively or additionally, the control system may be configured to determine the amount of liquid aerosol-forming substrate held in the liquid storage portion when prompted by a user.

In some example embodiments, the aerosol-generating system may comprise aerosol-generating means arranged to receive liquid aerosol-forming substrate from the liquid storage portion. In these example embodiments, it is generally desirable for the aerosol-generating means to receive liquid aerosol-forming substrate from the liquid storage portion at a particular rate, such that the aerosol-generating means is consistently wetted by liquid aerosol-forming substrate. Activation of the aerosol-generating means when insufficient liquid aerosol-forming substrate is received by the aerosol-generating means may result in generation of an aerosol-comprising undesirable components or an undesirable increase in temperature of the aerosol-generating means that may damage the aerosol-generating means.

The control system may be configured to compare the measured electrical quantity information from at least one of the first and second pairs of electrodes to specific (or, alternatively, predetermined) threshold electrical quantity information stored in the control system. The stored threshold electrical quantity information may be associated with a specific (or, alternatively, predetermined) threshold amount value. The control system may be configured to prevent or inhibit operation of the aerosol-generating means when the comparison indicates that the amount of liquid aerosol-forming substrate held in the liquid storage portion is below the threshold amount value.

In some example embodiments, the control system may be configured to compare the determined amount of liquid aerosol-forming substrate to the specific (or, alternatively, predetermined) threshold amount value. The control system may be configured to prevent or inhibit operation of the aerosol-generating means when the determined amount of liquid aerosol-forming substrate is below the specific (or, alternatively, predetermined) threshold amount value.

Preventing operation of the aerosol-generating means when the measured electrical quantity information indicates that the amount of liquid aerosol-forming substrate held in the liquid storage portion is below a threshold amount value may disable, e.g. substantially disable, or inhibit operation of, the aerosol-generating means when there is insufficient liquid aerosol-forming substrate for the aerosol-generating system to function as intended. This may improve the user experience and prolong the life of the aerosol-generating means.

The threshold amount value may be set in the factory or by a user before first use. The threshold amount value may be any suitable amount. For example, the threshold amount value may be between about 1% and about 15% of the liquid storage portion volume, or between about 3% and 10% or about 5%. For example, for a liquid storage portion configured to hold about 2 ml of liquid aerosol-forming substrate, the threshold amount value may be between about 0.1 ml and about 0.3 ml. The specific threshold amount value may be dependent on the cross-sectional area of the aerosol-generating means and the volume of the liquid storage portion. For example, the aerosol-generating means may be or may include a heater and a heater having a large cross-sectional area may require more liquid aerosol-forming substrate than a heater having a small cross-sectional area in order to operate at the desired temperature. Thus, an aerosol-generating system having a large heater may have a larger minimum threshold amount than an aerosol-generating system having a smaller heater. The threshold amount value may be between about 0.1 ml and 10 ml, or between about 0.5 ml and about 5 ml, or about 0.5 ml; however, example embodiments are not limited thereto.

The control system may be configured to prevent or inhibit operation of the aerosol-generating means in any suitable manner. The control system may be configured to send a control signal to the aerosol-generating means to prevent or inhibit operation. The control system may be configured to prevent or inhibit power from being supplied to the aerosol-generating means.

The control system may be configured to disable the aerosol-generating means. The control system may be configured to reversibly disable the aerosol-generating means. The control system may be configured to enable the aerosol-generating means if the determined amount is above the threshold amount. The control system may be configured to irreversibly disable the aerosol-generating means. The control system may be configured to damage or break a frangible connection between the aerosol-generating means and a power supply. This may be advantageous for a disposable cartridge of an aerosol-generating system comprising the aerosol-generating means and for a disposable aerosol-generating system.

In some example embodiments, the control system may be configured to reversibly prevent or inhibit operation of the aerosol-generating means based on the determine orientation of the liquid storage portion. This may ensure that the aerosol-generating system generates aerosol under certain conditions, e.g. optimal conditions, only.

In some example embodiments, the control system may be configured to prevent or inhibit operation of the aerosol-generating means based on the determined amount of liquid aerosol-forming substrate held in the liquid storage portion and the determined orientation of the liquid storage portion.

The liquid storage portion may be any suitable shape and size. For example, the liquid storage portion may have a cross-section that is substantially circular, elliptical, square, rectangular or triangular. The liquid storage portion may be substantially tubular or cylindrical. The liquid storage portion may have a length and a width or a diameter. The length of the liquid storage portion may be greater than the width or the diameter of the liquid storage portion. In other words, the liquid storage portion may be elongated. The liquid storage portion may have a central longitudinal axis. The cross-section of the liquid storage portion may be substantially uniform along the central longitudinal axis. In other words, the shape and size of the cross-section of the liquid storage portion may be substantially constant along the length of the liquid storage portion. The liquid storage portion may have one or more degrees of rotational symmetry about the central longitudinal axis. The liquid storage portion may be annular. The liquid storage portion may be annular and may comprise a central passage. The central passage may extend in the direction of the central longitudinal axis.

The first portion of the liquid storage portion may also be any suitable shape and size. For example, the shape of the cross-section of the first portion may be substantially circular, elliptical, square, rectangular or triangular. The first portion may be substantially tubular or cylindrical. The first portion may be elongated. The first portion may have a central longitudinal axis. The cross-section of the first portion may be substantially uniform along the longitudinal axis. The cross-section of the first portion may be substantially uniform along the length of the first portion. The first portion may be annular. The first portion may be annular and may comprise a central passage.

The second portion of the liquid storage portion may also be any suitable shape and size. For example, the shape of the cross-section of the second portion may be substantially circular, elliptical, square, rectangular or triangular. The second portion may be substantially tubular or cylindrical. The second portion may be elongated. The second portion may have a central longitudinal axis. The cross-section of the second portion may be substantially uniform along the central longitudinal axis. The cross-section of the second portion may be substantially uniform along the length of the second portion. The second portion may be annular. The second portion may be annular and may comprise a central passage.

The first and second portions of the liquid storage portion may not overlap. The first and second portions of the liquid storage portion may be arranged end-to-end. The first and second portions of the liquid storage portion may share a common axis. The first and second portions of the liquid storage portion may share a common central longitudinal axis.

In some example embodiments, the first portion of the liquid storage portion comprises a first half of the liquid storage portion and the second portion of the liquid storage portion comprises a second half of the liquid storage portion.

In some further example embodiments, the first portion of the liquid storage portion and the second portion of the liquid storage portion are identical, or substantially identical, or similar. In other words, the shape and size of the first and second portions may be the same.

The liquid storage portion may comprise a housing or a container configured to hold liquid aerosol-forming substrate. The container may comprise a first end, a second end, and one or more sidewalls extending between the first end and the second end. The first end, second end and sidewalls may be integrally formed. The first end, second end and sidewalls may be distinct elements that are attached or secured to each other. The container may be rigid. As used herein, the term 'rigid container' is used to mean a container that is self-supporting. The container may comprise one or more flexible walls. The flexible walls may be configured to adapt to the volume of the liquid aerosol-forming substrate held in the liquid storage portion. The container may be formed from any suitable material. The container may be formed from a substantially fluid impermeable material. The container may comprise a transparent or a translucent portion, such that liquid aerosol-forming substrate held in the liquid storage portion may be visible to a user through the transparent or translucent portion of the container.

In some example embodiments, the electrodes of the first pair of electrodes may be arranged such that at least a portion of the first portion of the liquid storage portion is arranged between the electrodes. The electrodes of the first pair of electrodes may be arranged at opposite sides of the first portion. Where the liquid storage portion is an annular liquid storage portion, having a central passage, one of the electrodes of the first pair of electrodes may be arranged at an outer side of the first portion and the other of the first pair of electrodes may be arranged at an inner side of the first portion, adjacent to or in the central passage.

In some example embodiments, the electrodes of the second pair of electrodes may be arranged such that at least a portion of the second portion of the liquid storage portion is arranged between the electrodes. The electrodes of the second pair of electrodes may be arranged at opposite sides of the second portion. Where the liquid storage portion is an annular liquid storage portion, having a central passage, one of the electrodes of the second pair of electrodes may be arranged at an outer side of the second portion and the other of the second pair of electrodes may be arranged at an inner side of the second portion, adjacent to or in the central passage.

In some example embodiments, where the electrodes of one of the pairs of electrodes are arranged with a portion of the liquid storage portion arranged between the electrodes, the pair of electrodes may form a capacitor and the portion of the liquid aerosol-forming substrate between the electrodes may form the dielectric of the capacitor. The dielectric properties of the portion of the liquid storage portion between the pair of electrodes may vary with the amount of liquid aerosol-forming substrate held in the portion of the liquid storage.

In some example embodiments, the electrodes of the first pair of electrodes may be arranged without a portion of the liquid storage portion arranged between the electrodes. The electrodes of the first pair of electrodes may be arranged at the same sides of the first portion of the liquid storage portion. In some example embodiments, the electrodes of the second pair of electrodes may be arranged without a portion of the second portion of the liquid storage portion arranged between the electrodes. The electrodes of the second pair of electrodes may be arranged at the same sides of the second portion of the liquid storage portion.

In some example embodiments, where the electrodes of one of the first and second pairs of electrodes are arranged without a portion of the liquid storage portion arranged between the electrodes, the pair of electrodes may form an interdigitated or an interdigital sensor. An interdigitated sensor may form a capacitive sensing system, such as an interdigital or interdigitated sensor, that may sense electrical properties of media adjacent to the sensor using fringing electric field effects.

An interdigitated sensor may comprise a pair of interdigitated electrodes. Each electrode of the pair of interdigitated electrodes may comprise a plurality of electrically connected projections, protrusions or fingers and gaps or spaces between the fingers. The fingers may be electrically connected by a main track or a spine. The fingers and gaps of each interdigitated electrode may be arranged in a regular or periodic arrangement. A pair of interdigitated electrodes may be arranged on a plane or a surface and the fingers of each of the electrodes may extend into the spaces between the fingers of the other electrode.

The first pair of electrodes may be interdigitated electrodes. The first pair of electrodes may form an interdigitated sensor. The second pair of electrodes may be interdigitated electrodes. The second pair of electrodes may form an interdigitated sensor. Where the liquid storage portion comprises a container, each pair of interdigitated electrodes may be arranged on a surface of the container. Each pair of interdigitated electrodes may be arranged on a surface of a platform. Each pair of interdigitated electrodes may be provided on a surface of a flexible platform that substantially circumscribes the liquid storage portion.

The fingers of each interdigitated electrode may have a length, a width and a thickness. The length of the fingers of each interdigitated electrode may be substantially greater than the width and the thickness of the fingers. In other words, the fingers of each interdigitated electrode may be linear, or substantially elongate. The fingers of each interdigitated electrode may be substantially linear. The fingers of each interdigitated electrode may extend substantially in one direction. Alternatively, the fingers of each interdigitated electrode may be substantially non-linear. For example, the fingers of each interdigitated electrode may be substantially curved or arcuate.

The fingers of each interdigitated electrode may be identical, or substantially identical, or similar to one another. The gaps between the fingers of each interdigitated electrode may be identical, or substantially identical. The fingers and gaps of each interdigitated electrode may be arranged in a regular arrangement, with a regular spacing or gap between each successive finger. The distance between successive fingers of each interdigitated electrode may be referred to as the spatial wavelength A or band gap of the electrode.

One of the electrodes of a pair of interdigitated electrodes may be a driving electrode that is supplied with an oscillating voltage. The other electrode may be a sensing electrode that senses the electric fringing field generated by the driving electrode. The electric fringing field generated by the driving electrode comprises an electric fringing field due to the stray electric fields at the edges of the fingers of the driving electrode, which comprises a component that extends out of the plane or surface on which the interdigitated electrodes are arranged, in a direction substantially normal to the plane or surface. As such, the electric fringing field generated by the driving electrode extends into the material arranged above or adjacent to the electrodes. That is, an interdigital sensor arranged at a side of the liquid storage portion of example embodiments may apply a spatially periodic electrical potential to the liquid storage portion at that side.

Electrical properties of a material arranged above or adjacent to an interdigitated sensor may affect the electric fringing field generated by the driving electrode. For example, the permittivity of a material arranged above or adjacent to an interdigitated sensor may affect the generated electric fringing field. Thus, the sensing electrode of the interdigitated sensor may sense changes in the electrical properties the material arranged above or adjacent to the electrodes.

Electrical shielding may be provided on one side of the platform or surface, such that the interdigitated sensor may react to changes in the electrical properties of the material adjacent to one side of the sensor only. Electrical shielding may be provided an opposite surface of a platform to the electrodes. The electrical shielding may comprise a sheet or mesh of electrically conductive material that extends beneath or over the opposite surface to the electrodes. The sheet or mesh of electrically conductive material may be grounded. The sheet or mesh may be electrically connected to a voltage follower that is electrically connected to the interdigitated electrodes. This arrangement may substantially remove any parasitic capacitance caused by the shielding, which may improve the sensitivity of the interdigitated sensor.

An example of a suitable interdigitated sensor may be of the type DRP-G-IDEPT10 from DROPSENS™.

The penetration depth of the electric fringing field generated by the driving electrode into the material arranged above or adjacent to the sensor may be generally proportional to the distance between adjacent fingers of the driving and sensing electrodes. In other words, the penetration depth of the generated electric fringing field may be proportional to the band gap of the interdigitated electrodes ($\lambda$). The penetration depth is independent of the frequency of the oscillating driving signal.

In general, the penetration depth of the generated electric fringing field may increase as the band gap $\lambda$ of the interdigitated electrodes increases. Typically that penetration depth has been found to be about one third of the band gap $\lambda$. Achieving a minimum penetration depth into the liquid storage portion in order to effectively sense the presence or absence of liquid aerosol-forming substrate may be desirable.

A suitable exemplary penetration depth for a generated electric fringing field into the liquid storage portion may be about 1 mm. The electrodes may be arranged at an outer surface of a side wall of the liquid storage portion. The thickness of the side wall may be about 1 mm. In example embodiments, a penetration depth of about 2 mm would be used, which corresponds to a band gap $\lambda$ of about 6 mm. In other cases, a side wall of the liquid storage portion and a platform on which the electrodes are mounted may be arranged between the electrodes and the liquid storage portion. The combined thickness of the side wall and platform may be about 2 mm. In example embodiments, a penetration depth of 3 mm would be used, which corresponds to a band gap $\lambda$ of about 9 mm. The band gap $\lambda$ of the electrodes may be between about 0.5 mm and about 15 mm or between about 1 mm and about 12 mm or between about 2 mm and about 10 mm.

The relatively small penetration depth of the electric fringing field generated by the interdigitated electrodes may mean that interdigitated electrodes adjacent to a liquid storage portion tend to sense the presence or absence of liquid aerosol-forming substrate at the surfaces or walls of the liquid storage portion only. This is different to pairs of electrodes arranged at opposite sides of the liquid storage portion with a portion of the liquid storage portion arranged between them, which sense the average electrical properties of the portion of the liquid storage portion arranged between them. As a result, measurements from interdigitated electrodes arranged adjacent to a liquid storage portion tend to indicate the proportion or fraction of the surface of the liquid storage portion that is wetted with liquid aerosol-forming substrate. The proportion or fraction of the surface of the sidewalls that is covered by liquid aerosol-forming substrate for a given amount of liquid aerosol-forming substrate and a given orientation of the liquid storage portion depends on the shape of the liquid storage portion. In these example embodiments, the cross-section of the liquid storage portion is preferably uniform along the central longitudinal axis. In example embodiments, the liquid storage portion may be substantially cylindrical.

In general, the sensitivity of interdigitated sensors may increase as the number of fingers provided on the interdigitated pair of electrodes increases. Thus, for a given size of liquid storage portion, the smaller the band gap of the electrodes, the greater the number of fingers may be provided on each electrode and the greater the sensitivity of the sensor.

In example embodiments, interdigitated electrodes may be desired or required to have a band gap that is equal to or above a minimum band gap in order to generate an electric fringing field with a penetration depth that is sufficient to reach into the liquid storage portion. As such, in example embodiments, the sensitivity of an interdigitated sensor tends to decrease as the size of the liquid storage portion decreases, as the number of fingers provided on each electrode is reduced rather than the size of the band gap. However, the sensitivity of a pair of electrodes arranged at opposite sides of a liquid storage portion with a portion of the liquid storage portion arranged between the electrodes, may increase as the size of the liquid storage portion decreases. This may be because the sensitivity of the electrodes to changes in the electrical properties of the material between the electrodes may increase as the distance between the electrodes decreases. Thus, in example embodiments, the size of the liquid storage portion may determine the type of sensor that is most appropriate. Generally, interdigitated sensors may be more appropriate for systems having larger liquid storage portions and electrodes arranged with portions of the liquid storage portion between the electrodes may be more appropriate for systems having smaller liquid storage portions.

The electrodes of each pair of electrodes may be generally spaced apart or separated from each other. This spacing or separation may substantially prevent or inhibit direct electrical contact between the electrodes of a pair of electrodes. The spacing, separation, or gap between the electrodes may be consistent along the lengths of the electrodes.

Where a pair of electrodes are arranged at opposite sides of the liquid storage portion, the spacing between the electrodes may be about the width of the liquid storage portion. For example, in example embodiments, the spacing between the electrodes of a pair of electrodes may be between about 0.5 mm and about 3 mm, or between about 0.5 mm and about 2 mm or between about 0.5 mm and about 1.5 mm.

Where a pair of electrodes are not arranged at opposite sides of the liquid storage portion, the spacing between the electrodes may be smaller. For example, in example embodiments, the spacing between the electrodes of a pair of electrodes may be between about 25 μm and about 500 μm, or between about 25 μm and about 200 μm, or between about 25 μm and about 100 μm.

The electrodes of the first and second pair of electrodes may be any suitable type of electrode. For example, suitable types of electrodes may include plate electrodes and track electrodes; however, example embodiments are not limited thereto. Each electrode of the first pair of electrodes may be the same type of electrode or a different type of electrode. Each electrode of the second pair of electrodes may be the same type of electrode or a different type of electrode.

The electrodes may by any suitable shape. For example, the electrodes may be: square, rectangular, curved, arcuate, annular, spiral or helical. The electrodes may comprise one or more sections that are substantially linear, non-linear, planar or non-planar. The electrodes may be rigid. Rigidity may enable the electrodes to maintain their shape and spacing from each other. Alternatively, the electrodes may be flexible. Flexibility may enable the electrodes to conform to the shape of the liquid storage portion. The electrodes may be configured to conform to the shape of a housing of the liquid storage portion.

The electrodes may have a length, a width and a thickness. The length of the electrodes may be substantially greater than the width of the electrodes. In other words, the electrodes may be linear, or elongate. The thickness of the electrodes may be substantially less than the length and the width of the electrodes. In other words, the electrodes may be thin. Thin electrodes and elongate electrodes may have a large surface area to volume ratio, which may improve the sensitivity of electrical quantity measurements.

The electrodes may comprise any suitable material. The electrodes may comprise any suitable electrically conductive material. Suitable electrically conductive materials include metals, alloys, electrically conductive ceramics and electrically conductive polymers. As used herein with respect to example embodiments, an electrically conductive material refers to a material having a volume resistivity at 20° C. of less than about $1\times10^{-5}$ Ωm, typically between about $1\times10^{-5}$ Ωm and about $1\times10^{-9}$ Ωm. The electrically conductive materials may particularly include at least one of copper, gold and platinum. The electrically conductive materials may include conductive inks when the electrodes are printed on the liquid storage portion. Suitable conductive inks may include silver to provide electrical conductivity. The electrodes may be coated with a passivation layer. The electrodes may comprise or be coated in material that is sufficiently non-reactive so as not to react with or contaminate the liquid aerosol-forming substrate. The electrodes may comprised transparent or translucent material. For example, a suitable transparent material may be Indium Tin Oxide (ITO).

The electrodes of the first pair of electrodes may be identical, or substantially identical, in composition. The electrodes of the second pair of electrodes may be identical, or substantially identical, in composition. The first pair of electrodes may be identical, or substantially identical, to the second pair of electrodes. All of the electrodes may be identical, or substantially identical.

The first pair of electrodes may be arranged at any suitable location relative to the first portion of the liquid storage portion. The second pair of electrodes may be arranged at any suitable location relative to the second portion of the liquid storage portion. The first pair of electrodes and the second pair of electrodes may not overlap. Where the first and second portions of the liquid storage portion are arranged end-to-end along a common central longitudinal axis, the first and second pairs of electrodes may not overlap along the common central longitudinal axis.

The first pair of electrodes may extend substantially in the direction of the length of the first portion of the liquid storage portion. The first pair of electrodes may extend substantially the length of the first portion of the liquid storage portion. Where the first portion of the liquid storage portion comprises a first half of the liquid storage portion, the first pair of electrodes may extend substantially half the length of the liquid storage portion. The first pair of electrodes may be arranged at a side of the first portion. The first pair of electrodes may be arranged at two or more sides of the first portion. The first pair of electrodes may substantially circumscribe the first portion. The first pair of electrodes may substantially surround the first portion. Where the first pair of electrodes substantially circumscribes the first portion and extends substantially the length of the first portion, the first pair of electrodes may form a tubular sleeve that substantially surrounds the first portion.

The second pair of electrodes may extend substantially in the direction of the length of the second portion of the liquid storage portion. The second pair of electrodes may extend substantially the length of the second portion of the liquid storage portion. Where the second portion of the liquid storage portion comprises a second half of the liquid storage portion, the second pair of electrodes may extend substantially half the length of the liquid storage portion. The second pair of electrodes may be arranged at a side of the second portion. The second pair of electrodes may be arranged at two or more sides of the second portion. The second pair of electrodes may substantially circumscribe the second portion. The second pair of electrodes may substantially surround the second portion. Where the second pair of electrodes substantially circumscribes the second portion and extends substantially the length of the second portion, the second pair of electrodes may form a tubular sleeve that substantially surrounds the second portion.

One or more of the electrodes of the first and second pairs of electrodes may be arranged in the liquid storage portion. One or more of the electrodes may be arranged in direct contact with liquid aerosol-forming substrate held in the liquid storage portion. Where a carrier material is provided in the liquid-storage portion, one or more of the electrodes may be arranged in contact with the carrier material. One or more of the electrodes of the first pair of electrodes may be arranged in the first portion of the liquid storage portion. One or more of the electrodes of the second pair of electrodes may be arranged in the second portion of the liquid storage portion. Where an electrode is arranged inside the liquid storage portion or at any position in which the electrode is likely to encounter liquid or moisture, the electrode may be protected or shielded from the liquid or moisture, such as by a coating of a hydrophobic material.

Where the liquid storage portion comprises a container for holding the liquid storage portion, one or more of the electrodes may be arranged at or on the container. One or more of the electrodes may be provided on an outer surface of the container. One or more of the electrodes may be provided on an inner surface of the container. The electrodes may form an integral part of the container.

One or more of the electrodes may be arranged on a platform. Each electrode may be arranged on a separate platform. The first pair of electrodes may be arranged on a first platform. The second pair of electrodes may be arranged on a second platform. The first and second pairs of electrodes may be arranged on the same platform.

The one or more platforms may be arranged at one or more of the sides of the liquid storage portion. The one or more platforms may substantially circumscribe the liquid storage portion. Where the liquid storage portion comprises a container, the one or more platforms may be provided at or on the container. The one or more platforms may be arranged at one or more of the sides of the container. The one or more platforms may substantially circumscribe the container. The one or more platforms may be separate from the container. The one or more platforms may be secured to the container. The one or more platforms may be integrally formed with the container. The one or more platforms may comprise the same material as the container. The one or more platforms may comprise a different material to the container.

The one or more platforms may be rigid. Alternatively, the one or more platforms may be flexible. The one or more flexible platforms may be bent around two or more sides of the liquid storage portion. The one or more flexible platforms may substantially circumscribe the liquid storage portion.

The one or more platforms may be formed of electrically insulating material. The one or more platforms may comprise any suitable electrically insulating material. For example, suitable electrically insulating materials include glasses, plastics and ceramic materials. Particularly suitable materials include polyimide and polyester. As used herein with respect to example embodiments, an electrically insulating material refers to a material having a volume resistivity at 20° C. of greater than about $1\times10^{6}\,\Omega m$, typically between about $1\times10^{9}\,\Omega m$ and about $1\times10^{21}\,\Omega m$.

In some example embodiments, the one or more platforms may be made from a hydrophobic material. The platform may be coated with a hydrophobic coating.

The one or more platforms may be or may include printed circuit boards. The electrodes may comprise conductive tracks printed on a surface of the one or more printed circuitry boards. The one or more printed circuit boards may be or may include flexible printed circuit boards.

The electrodes may be applied to a surface of a container or a platform. The electrodes may be applied to a surface of a container or a platform by any suitable means of application, such as by printing, coating and spraying. The electrodes may be secured to a surface of a container or a platform. The electrodes may be secured to a surface of a container or a platforms by any suitable means, such as by an adhesive. The electrodes may be etched in a container or a platform.

The aerosol-generating system may be provided with more than one first pair of electrodes and more than one second pair of electrodes. In some example embodiments, the system may comprise two or more first pairs of electrodes arranged adjacent to or in the first portion of the liquid storage portion, and two or more second pairs of electrodes arranged adjacent to or in the second portion of the liquid storage portion. In these example embodiments, the control system may be configured to: measure an electrical quantity between each first pair of electrodes; measure an electrical quantity between each second pair of electrodes; and determine the orientation of the liquid storage portion based on measurements of the electrical quantity between the first pairs of electrodes and measurements of the electrical quantity between the second pairs of electrodes.

Providing the system with more than one first pair of electrodes and more than one second pair of electrodes may improve the accuracy of the determination of the orientation of the liquid storage portion. Providing the system with more than one first and second pairs of electrodes may enable the system to determine whether the liquid storage portion is at more than one particular orientation. For example, the control system may be configured to determine whether the liquid storage portion is at a horizontal orientation and whether the liquid storage portion is at a vertical orientation.

The control system may comprise electric circuitry. The electric circuitry may comprise a microprocessor, which may be a programmable microprocessor. The electric circuitry may comprise further electronic components. The electric circuitry may be configured to regulate or control a voltage applied to the first pair of electrodes and the second pair of electrodes.

The control system may be configured to control or regulate a voltage applied to at least one of the first pair of electrodes and at least one of the second pair of electrodes. The control system may be configured to control or regulate a supply of power to the aerosol-generating means.

A voltage may be applied continuously to at least one of the first pair of electrodes and at least one of the second pair of electrodes. A voltage may be applied to the first pair of electrodes and the second pair of electrodes following activation of the system. A voltage may be applied to at least one of the first pair of electrodes and at least one of the second pair of electrodes in the form of pulses of electrical current. A voltage may be applied to at least one of the first pair of electrodes and at least one of the second pair of electrodes intermittently, such as on a draw-by-draw basis.

The control system may be configured to supply an oscillating measurement signal to at least one of the first pair of electrodes and at least one of the second pair of electrodes. In other words, the control system may be configured to apply an alternating voltage to at least one of the first pair of electrodes and at least one of the second pair of electrodes. The control system may be configured to supply an oscillating measurement signal to at least one of the first pair of electrodes and at least one of the second pairs of electrodes at a specific (or, alternatively, predetermined) frequency. The frequency may be any suitable frequency for the control system to measure the electrical quantity between the first pair of electrodes and between the second pair of electrodes. The frequency may be equal to or less than about 20 MHz, or equal to or less than about 10 MHz. The frequency may be between about 10 kHz and about 10 MHz, or between about 10 kHz and about 1 MHz, or between about 100 kHz and about 1 MHz. The control system may be configured to supply the same oscillating measurement signal to the first and second pairs of electrodes. The control system may be configured to supply different oscillating measurement signals to the first and second pairs of electrodes.

Liquid aerosol-forming substrates may comprise different compositions with different electrical properties. The control system may be configured to identify the liquid aerosol-forming substrate held storage portion based on the electrical quantity measurements between the first and second pairs of electrodes. The control system may be configured to adjust the determination of the amount of liquid aerosol-forming substrate held in the liquid storage portion based on the determined identity. For example, the control system may be configured to compensate for the composition of the liquid aerosol-forming substrate held in the liquid storage portion.

The control system may comprise any suitable means for measuring the electrical quantity between the first and second pairs of electrodes. Suitable means include one or more RC integrators, one or more bridge circuits, one or more oscillators, and one or more switched capacitor circuits which make use of amplifiers. These switched capacitor circuits may be configured in amplifying or integrating modes.

The electrical quantity to be measured may be any suitable electrical quantity. For example, the electrical quantity to be measured may be one or more of voltage, current, impedance, resistance and capacitance. In example embodiments, the electrical quantity to be measured may be capacitance.

The electrical quantity to be measured by the control system may be capacitance. The variation in capacitance may be particularly pronounced where the liquid aerosol-forming substrate comprises dielectric materials.

The capacitance between the first pair of electrodes may depend on the amount of liquid aerosol-forming substrate held in the first portion of the liquid storage portion. The capacitance between the second pair of electrodes may depend on the amount of liquid aerosol-forming substrate held in the second portion of the liquid storage portion.

For example, the first pair of electrodes may form a capacitor and the first portion of the liquid storage portion may form the dielectric of the capacitor. The first portion may comprise a capacitive load and the permittivity of the first portion may depend on the amount of liquid aerosol-forming substrate held in the liquid storage portion. The capacitance between the first pair of electrodes may decrease as the amount of liquid aerosol-forming substrate held in the first portion decreases. The capacitive load of the first portion may have a capacitance in the picofarad (pF) range. This may enable fast charging and discharging times of the capacitor, and may enable fast measurements of the capacitance. The same arrangement and configuration may apply to the second pair of electrodes and the second portion of the liquid storage portion.

The capacitance may be measured. For example, the control system may comprise means for measuring charge and discharge times of the capacitors formed by the first and second pairs of electrodes. The control system may comprise a timer circuit, such as a 555 timer circuit, or any electronic circuit whose oscillating frequency depends on a capacitance, and may be configured to determine capacitance based on the frequency of the timer circuit output.

The capacitance may be calculated. For example, the capacitance may be calculated from measurements of the magnitude of the voltage and the current and the phase difference between the voltage and the current. The capacitance may be calculated from measurements of the impedance. The amount of liquid aerosol-forming substrate held in the liquid storage portion may be calculated from the measured or calculated capacitance.

The orientation of the liquid storage portion may be determined from the measured or calculated capacitance. The amount of liquid aerosol-forming substrate held in the liquid storage portion may be determined from the measured or calculated capacitance.

The liquid storage portion may comprise aerosol-forming substrate held in the liquid storage portion. As used herein with reference to example embodiments, an aerosol-forming substrate is a substrate capable of releasing volatile compounds that can form an aerosol. Volatile compounds may be released by heating the aerosol-forming substrate. Volatile compounds may be released by moving the aerosol-forming substrate through passages of a vibratable element.

The aerosol-forming substrate may be liquid. The aerosol-forming substrate may be liquid at room temperature. The aerosol-forming substrate may comprise both liquid and solid components. The liquid aerosol-forming substrate may comprise nicotine. The nicotine containing liquid aerosol-forming substrate may be a nicotine salt matrix. The liquid aerosol-forming substrate may comprise plant-based material. The liquid aerosol-forming substrate may comprise tobacco. The liquid aerosol-forming substrate may comprise a tobacco-containing material containing volatile tobacco flavour compounds, which are released from the aerosol-forming substrate upon heating. The liquid aerosol-forming substrate may comprise homogenised tobacco material. The liquid aerosol-forming substrate may comprise a non-tobacco-containing material. The liquid aerosol-forming substrate may comprise homogenised plant-based material.

The liquid aerosol-forming substrate may comprise one or more aerosol-formers. An aerosol-former is any suitable known compound or mixture of compounds that, in use, facilitates formation of a dense and stable aerosol and that is substantially resistant to thermal degradation at the temperature of operation of the system. Examples of suitable aerosol formers include glycerine and propylene glycol. Suitable aerosol-formers include, but are not limited to: polyhydric alcohols, such as triethylene glycol, 1,3-butanediol and glycerine; esters of polyhydric alcohols, such as glycerol mono-, di- or triacetate; and aliphatic esters of mono-, di- or polycarboxylic acids, such as dimethyl dodecanedioate and dimethyl tetradecanedioate. The liquid aerosol-forming substrate may comprise water, solvents, ethanol, plant extracts and natural or artificial flavours.

The liquid aerosol-forming substrate may comprise nicotine and at least one aerosol former. The aerosol former may be glycerine or propylene glycol. The aerosol former may comprise both glycerine and propylene glycol. The liquid aerosol-forming substrate may have a nicotine concentration of between about 0.5% and about 10%, for example about 2%.

The liquid aerosol-forming substrate may contain a mixture of dielectric materials, each with a separate dielectric constant ($\varepsilon_r$). The main constituents of a liquid aerosol-forming substrate at room temperature, about 20° C., may include: glycerine ($\varepsilon_r$~42), propylene glycol ($\varepsilon_r$~32), water ($\varepsilon_r$~80), air ($\varepsilon_r$~1), nicotine and flavourants. Where the liquid aerosol-forming substrate forms a dielectric material, the electrical quantity to be measured by the control system may be or may include capacitance.

The liquid storage portion may comprise a carrier material for holding the liquid aerosol-forming substrate. Where the liquid storage portion comprises a container, the carrier material may be arranged within the container. The liquid aerosol-forming substrate may be adsorbed or otherwise loaded onto the carrier material. The carrier material may be made from any suitable absorbent body of material, for example, a foamed metal or plastics material, polypropylene, terylene, nylon fibres, or ceramic. The aerosol-forming substrate may be retained in the carrier material prior to use of the aerosol-generating system. The aerosol-forming substrate may be released into the carrier material during use. For example, the liquid aerosol-forming substrate may be provided in a capsule.

The aerosol-generating system may comprise aerosol-generating means. The aerosol-generating means may be arranged to receive aerosol-forming substrate from the liquid storage portion. The aerosol-generating means may be or may include an atomiser. The aerosol-generating means may be configured to atomise received aerosol-forming substrate using heat. The aerosol-generating means may comprise heating means for atomising received liquid aerosol-forming substrate. The aerosol-generating means may be configured to atomise received aerosol-forming substrate using ultrasonic vibrations. The aerosol-generating means may comprise an ultrasonic transducer.

The aerosol-generating means may comprise one or more aerosol-generating elements. The one or more aerosol-generating elements may be or may include heating elements. The one or more aerosol-generating elements may comprise one or more vibratable elements.

The aerosol-generating means may comprise heating means configured to heat the aerosol-forming substrate. The heating means may be any suitable heating means. The heating means may comprise one or more heating elements. The one or more heating elements may be arranged to heat the aerosol-forming substrate primarily by means of conduction. The one or more heating elements may be arranged substantially in direct contact with the aerosol-forming substrate. The one or more heating elements may be arranged to transfer heat to the aerosol-forming substrate via one or more heat conductive elements. The one or more heating elements may be arranged to transfer heat to ambient air drawn through the aerosol-generating system during use, which may heat the aerosol-forming substrate by convection. The one or more heating elements may be arranged to heat the ambient air before the ambient air is drawn through the aerosol-forming substrate. The one or more heating elements may be arranged to heat the ambient air after the ambient air is drawn through the aerosol-forming substrate.

The heating means may be or may include electric heating means or an electric heater. The electric heater may comprise one or more electric heating elements. The one or more electric heating elements may comprise an electrically resistive material. Suitable electrically resistive materials may include: semiconductors such as doped ceramics, electrically "conductive" ceramics (such as, for example, molybdenum disilicide), carbon, graphite, metals, metal alloys, and composite materials made of a ceramic material and a metallic material. The one or more electric heating elements may take any suitable form. For example, the one or more electric heating elements may take the form of one or more heating blades, one or more heating needles or rods, one or more heating wires or filaments. The one or more heating elements may comprise one or more flexible sheets of material. The one or more heating elements may be deposited in or on a rigid carrier material.

The heating means may comprise inductive heating means. Inductive heating means are described in more detail below, in relation to the cartridge. The heating means may comprise one or more heat sinks or heat reservoirs. The heating means may comprise means for heating a small amount of liquid aerosol-forming substrate at a time.

The aerosol-generating means may comprise one or more vibratable elements and one or more actuators arranged to excite vibrations in the one or more vibratable elements. The one or more vibratable elements may comprise a plurality of passages through which aerosol-forming substrate may pass and become atomised. The one or more actuators may comprise one or more piezoelectric transducers.

The aerosol-generating means may comprise one or more capillary wicks for conveying liquid aerosol-forming substrate held in the liquid storage portion to the one or more elements of the aerosol-generating means. The liquid aerosol-forming substrate may have physical properties, including viscosity, which may allow the liquid to be transported through the one or more capillary wicks by capillary action.

The aerosol-generating means may comprise one or more heating wires or filaments encircling a portion of one or more capillary wicks. The heating wire or filament may support the encircled portion of the one or more capillary wicks. The capillary properties of the one or more capillary wicks, combined with the properties of the liquid substrate, may ensure that, during normal use when there is sufficient aerosol-forming substrate, the wick is always wet with liquid aerosol-forming substrate in the area of the aerosol-generating means. When the one or more capillary wicks are dry, the one or more capillary wicks may not deliver a regular supply of liquid aerosol-forming substrate to the aerosol-generating means.

The aerosol-generating system may comprise a power supply. The aerosol-generating system may comprise a power supply arranged to supply power to the control system, the first pair of electrodes, the second pair of electrodes, and the aerosol-generating means. The aerosol-generating means may comprise a single power supply. The aerosol-generating means may comprise a first power supply arranged to supply power to the first and second pairs of electrodes and a second power supply configured to supply power to the aerosol-generating means.

The power supply may be or may include a DC power supply. The power supply may be or may include a battery. The battery may be a Lithium based battery, for example a Lithium-Cobalt, a Lithium-Iron-Phosphate, a Lithium Titanate, or a Lithium-Polymer battery. The battery may be or may include a Nickel-metal hydride battery or a Nickel cadmium battery. The power supply may be another form of charge storage device such as a capacitor. The power supply may require recharging and be configured for many cycles of charge and discharge. The power supply may have a capacity that allows for the storage of enough energy for one or more user experiences; for example, the power supply may have sufficient capacity to allow for the continuous generation of aerosol for a period of around six minutes, corresponding to the typical time taken to smoke a cigarette, or for a period that is a multiple of six minutes. In another example, the power supply may have sufficient capacity to allow for a specific (or, alternatively, predetermined) number of vapour draws or discrete activations of the heating means and actuator.

The aerosol-generating system may comprise a control system configured to operate the aerosol-generating means. The control system configured to operate the aerosol-generating means may be the control system configured to determine the orientation of the liquid storage portion.

The aerosol-generating system may comprise a temperature sensor in communication with the control system. The temperature sensor may be adjacent to the liquid storage portion. The temperature sensor may be in thermal proximity to the liquid storage portion. The temperature sensor may be or may include a thermocouple. At least one element of the aerosol-generating means may be used by the control system to provide information relating to the temperature. The temperature dependent resistive properties of the at least one element may be known and used to determine the temperature of the at least one element in a manner known to the skilled person. The control system may be configured to account for the effect of temperature on the electrical load of the liquid storage portion using measurements of temperature from the temperature sensor. For example, where the portions of the liquid storage portion arranged between the first and second pairs of electrodes comprises a capacitive load, the control system may be configured to account for variations in the dielectric properties of liquid aerosol-forming substrate held in the liquid storage portion due to changes in temperature.

The aerosol-generating system may comprise a vapour draw detector in communication with the control system. The vapour draw detector may be configured to detect when a user draws on the mouthpiece. In some example embodiments, at least one of the first and second pairs of electrodes may be used as the vapour draw detector.

The aerosol-generating system may comprise a user input, such as a switch or button. The user input may enable a user to selectively turn the system on and off.

The aerosol-generating system may comprise indication means for indicating the determined orientation of the liquid aerosol-forming substrate. The control system may be configured to activate the indication means when the orientation of the liquid storage portion is determined to be suitable for a user to vapour draw of the aerosol-generating system. The control system may be configured to activate the indication means when the orientation of the liquid storage portion is determined to be suitable for a determination of the amount of liquid aerosol-forming substrate held in the liquid storage portion to be made.

The aerosol-generating system may also comprise indication means for indicating the determined amount of liquid aerosol-forming substrate held in the liquid storage portion to a user. The control system may be configured to activate the indication means after a determination of the amount of liquid aerosol-forming substrate held in the liquid storage portion has been made.

The indication means may comprise one or more of lights, such as light emitting diodes (LEDs), a display, such as an LCD display, and audible indication means, such as a loudspeaker or buzzer and vibrating means. The control system may be configured to light one or more of the lights, display at least one of an orientation and an amount on the display, emit sounds via the loudspeaker or buzzer, and vibrate the vibrating means.

The aerosol-generating system may comprise a housing. The housing may be elongated. The housing may comprise any suitable material or combination of materials. Examples of suitable materials may include metals, alloys, plastics or composite materials containing one or more of those materials, or thermoplastics that are suitable for food or pharmaceutical applications, for example polypropylene, polyetheretherketone (PEEK) and polyethylene. The material may be light and non-brittle.

The housing may comprise a cavity for receiving the liquid storage portion. In some example embodiments, the housing may comprise a cavity for receiving a cartridge comprising the liquid storage portion, as described in more detail below. The housing may comprise a cavity for receiving the power supply. The housing may comprise a mouthpiece. The mouthpiece may comprise at least one air inlet and at least one air outlet.

The aerosol-generating system may be portable. The aerosol-generating system may have a size comparable to a cigar or cigarette. The aerosol-generating system may have a total length between about 30 mm and about 150 mm. The aerosol-generating system may have an external diameter between about 5 mm and about 30 mm.

The aerosol-generating system may comprise a main unit and a cartridge. The main unit may comprise the control system. The cartridge may comprise the liquid storage portion for holding the liquid aerosol-forming substrate. The main unit may be configured to removably receive the cartridge.

In some example embodiments, the aerosol-generating system may comprise a cartridge comprising the liquid storage portion and a main unit comprising the control system and a cavity for receiving the cartridge. The first pair of electrodes may be arranged either in the cartridge or in the cavity of the main unit and the second pair of electrodes may be arranged either in the cartridge or in the cavity of the main unit.

Where the first pair of electrodes are arranged in the cavity of the main unit, the first pair of electrodes may be arranged such that a first portion of the liquid storage portion of the cartridge is arranged adjacent to the first pair of electrodes when the cartridge is received in the cavity. Where the second pair of electrodes are arranged in the cavity of the main unit, the second pair of electrodes may be arranged such that a second portion of the liquid storage portion of the cartridge is arranged adjacent to the second pair of electrodes when the cartridge is received in the cavity.

The main unit may comprise the one or more power supplies.

In some example embodiments, the main unit may comprise the aerosol-generating means. In other example embodiments, the cartridge may comprise the aerosol-generating means. Where the cartridge comprises the aerosol-generating means, the cartridge may be referred to as a 'cartomiser'. In other example embodiments, the aerosol-generating system may comprise an aerosol-generating component comprising the aerosol-generating means. The aerosol-generating component may be a separate component from the main unit and the cartridge. The aerosol-generating component may be removably receivable by at least one of the main unit and the cartridge.

Where the main unit comprises at least one of the first and second pairs of electrodes, the control system may be configured to identify and/or authenticate a cartridge. For example, the control system may be configured to determine the presence or absence of a pair of electrodes on the cartridge, which may be used to verify whether the cartridge received by the main unit 100 is a genuine or authentic cartridge from the manufacturer of the main unit. Measurements between at least one of the first and second pairs of electrodes may also be used to identify and/or authenticate a cartridge received by the main unit. The control system may also be configured to determine whether a cartridge has been correctly received by the main unit based on the presence or absence of a pair of electrodes on the cartridge or from measurements of electrical quantities between the first and second pairs of electrodes.

The main unit and the cartridge may comprise inductive heating means. The main unit may comprise an inductor coil and a power supply configured to provide high frequency oscillating current to the inductor coil. The cartridge may comprise a susceptor element 205 positioned to heat the aerosol-forming substrate. As used herein, a high frequency oscillating current means an oscillating current having a frequency of between 10 kHz and 20 MHz. Inductive heating means may enable the system to require no electrical contacts between the cartridge and main unit.

The cartridge may be removably coupled to the main unit. As used herein, the term 'removably coupled' is used to mean that the cartridge and the main unit can be coupled and uncoupled from one another without significantly damaging either the main unit or the cartridge. The cartridge may be removable from the cavity of the main unit when the aerosol-forming substrate has been consumed. The cartridge may be disposable. The cartridge may be reusable and the cartridge may be refillable with liquid aerosol-forming substrate. Cartridges may be replaceable in the cavity of the main unit. The main unit may be reusable.

The cartridge may have a housing or a container within which a liquid aerosol-forming substrate is held. The container may be rigid. The container may be formed from a material that is impermeable to liquid. The cartridge or the container may comprise a lid. The lid may be peelable before coupling of the cartridge to the main unit. Alternatively or additionally, the lid may be piercable. The main unit may comprise a piercing element for piercing the lid of the cartridge when the cartridge is coupled to the main unit.

The main unit may comprise a mouthpiece. The mouthpiece may comprise at least one air inlet and at least one air outlet. The mouthpiece may comprise more than one air inlet. The mouthpiece may comprise the piercing element.

In a second aspect of example embodiments, there is provided a main unit for an aerosol-generating system according to the first aspect of example embodiments. The main unit comprises: a cavity for receiving a cartridge comprising the liquid storage portion; the first pair of electrodes arranged at a first portion of the cavity such that the first pair of electrodes are adjacent to a first portion of a liquid storage portion of the cartridge when the cartridge is received in the cavity; the second pair of electrodes arranged at a second portion of the cavity such that the second pair of electrodes are adjacent to a second portion of the liquid storage portion of the cartridge when the cartridge is received in the cavity; and the control system.

In a third aspect of example embodiments, there is provided a control system for an aerosol-generating system according to the first aspect of example embodiments. The control system is configured to: measure an electrical quantity between a first pair of electrodes; measure an electrical quantity between a second pair of electrodes; and determine the orientation of a liquid storage portion based on measurements of the electrical quantity between the first pair of electrodes and measurements of the electrical quantity between the second pair of electrodes.

In a fourth aspect of example embodiments, there is provided a cartridge for an aerosol-generating system according to the first aspect of example embodiments. The cartridge comprises the liquid storage portion, the first pair of electrodes and the second pair of electrodes.

In particular, the cartridge may comprise a liquid storage portion having a first portion and a second portion. The first portion of the liquid storage portion may have a central longitudinal axis and the cross-section of the first portion of the liquid storage portion may be substantially uniform along the central longitudinal axis. The second portion of the liquid storage portion may have a central longitudinal axis and the cross-section of the second portion of the liquid storage portion may be substantially uniform along the central longitudinal axis. The first portion and the second portion may be arranged substantially end-to-end. The first portion and the second portion may be arranged end-to-end along a common central longitudinal axis. The first portion and the second portion may be identical, or substantially identical. The first portion may comprise a first half of the liquid storage portion and the second portion may comprise a second half of the liquid storage portion. The liquid storage portion may be substantially cylindrical. The liquid storage portion may be substantially elongate.

The first portion may have a length and the first pair of electrodes may extend substantially the length of the first portion. The second portion may have a length and the second pair of electrodes may extend substantially the length of the second portion.

In a fifth aspect of example embodiments, there is provided a method of determining the orientation of a liquid storage portion of an aerosol-generating system comprising: a liquid storage portion for holding a liquid aerosol-forming substrate, the liquid storage portion comprising a first portion in fluid communication with a second portion; a first pair of electrodes arranged adjacent to or in the first portion of the liquid storage portion; and a second pair of electrodes arranged adjacent to or in the second portion of the liquid storage portion. The method may comprise measuring an electrical quantity between the first pair of electrodes; measuring an electrical quantity between the second pair of electrodes; and determining the orientation of the liquid storage portion based on measurements of the electrical quantity between the first pair of electrodes and measurements of the electrical quantity between the second pair of electrodes.

In a sixth aspect of example embodiments, there is provided a method of determining the amount of liquid aerosol-forming substrate held in the liquid storage portion of an aerosol-generating system comprising a liquid storage portion having a first portion and a second portion, a first pair of electrodes arranged adjacent to or in the first portion of the liquid storage portion and a second pair of electrodes arranged adjacent to or in the second portion of the liquid storage portion, the method may comprise measuring an electrical quantity between the first pair of electrodes; measuring an electrical quantity between the second pair of electrodes; comparing the electrical quantities measured between the first and second pairs of electrodes to one or more reference orientation conditions; and in response to the determined orientation matching one or more of the reference orientation conditions, determining the amount of liquid aerosol-forming substrate held in the liquid storage portion based on the electrical quantity measurements between the first and second pairs of electrodes.

The reference orientation conditions may include: comparing the electrical quantity measured between the first pair of electrodes to one or more first reference electrical quantity values; comparing the electrical quantity measured between the second pair of electrodes to one or more first reference electrical quantity values; and comparing the electrical quantity measured between the first pair of electrodes and the electrical quantity measured between the second pair of electrodes.

The first reference electrical quantity information may include a first large, or maximum, reference electrical quantity, which corresponds to a measurement of an electrical quantity between the first pair of electrodes when the first portion of the liquid storage portion is full of liquid aerosol-forming substrate, and a first small, or minimum, reference electrical quantity, which corresponds to a measurement of an electrical quantity between the first pair of electrodes when the first portion of the liquid storage portion is empty of liquid aerosol-forming substrate. Similarly, the second reference electrical quantity information may include a second large, or maximum, reference electrical quantity, corresponding to a measurement of an electrical quantity between the second pair of electrodes when the second portion of the liquid storage portion is full of liquid aerosol-forming substrate, and a second small, or minimum, reference electrical quantity, corresponding to a measurement of an electrical quantity between the second pair of electrodes when the second portion of the liquid storage portion is empty of liquid aerosol-forming substrate.

The determination of the amount of liquid aerosol-forming substrate may comprise combining the electrical quantity measured between the first pair of electrodes and the electrical quantity measured between the second pair of electrodes. In some example embodiments, the determination of the amount of liquid aerosol-forming substrate may further comprise calculating the amount of liquid aerosol-forming substrate using the combined measurements. In some example embodiments, the determination of the amount of liquid aerosol-forming substrate may further comprise comparing the combined measurements to reference electrical quantity information associated with reference amount information to determine the amount of liquid aerosol-forming substrate held in the liquid storage portion.

In some example embodiments, the first pair of electrodes may form a first capacitor and the second pair of electrodes may form a second capacitor. In these example embodiments, the method may comprise measuring the capacitance of the first capacitor; measuring the capacitance of the second capacitor; comparing the measured capacitance of the first capacitor to a first reference maximum value and a first reference minimum value; comparing the measured capacitance of the second capacitor to a second reference maximum value and a second reference minimum value; determining if one or more of the following conditions is true: the measured capacitances of the first and second capacitor are substantially equal; the measured capacitance of the first capacitor is substantially equal to the first maximum reference value and the measured capacitance of the second capacitor is substantially equal to or greater than the second minimum reference value; and the measured capacitance of the first capacitor is substantially equal to or greater than the first minimum reference value and the measured capacitance of the second capacitor is substantially equal to the second minimum reference value; and in response to one or more of the conditions being determined to be true: calculating a sum of the measured capacitances of the first and second capacitors; and determining an amount of liquid aerosol-forming substrate held in the liquid storage portion based on the calculated sum of the measured capacitances.

It will be appreciated that features described in relation to one aspect of example embodiments may also be applicable to other aspects of example embodiments. Features described in relation of the aerosol-generating system may be applicable to the main unit of the second aspect of example embodiments, the control system of the third aspect of example embodiments and the cartridge of the fourth aspect of example embodiments and vice versa. Features described in relation to the aerosol-generating system may also be applicable to the methods of the fifth and sixth aspects of example embodiments and vice versa.

FIG. 1 is a schematic illustration of an example of an aerosol-generating system. FIG. 1 is schematic in nature, and the components shown are not necessarily to scale either individually or relative to one another. The aerosol-generating system comprises a main unit 100, which may be reusable, in cooperation with a cartridge 200, which may be disposable. The aerosol-generating system shown in FIG. 1 is an electrically operated smoking system.

The main unit 100 comprises a housing 101. The housing 101 is substantially circularly cylindrical and has a longitudinal length of about 100 mm and an external diameter of about 20 mm, comparable to a cigar. The main unit 100 comprises an electric power supply in the form of a lithium ion phosphate battery 102 and a control system in the form of control electronics 104. The housing 101 also defines a cavity 112 into which the cartridge 200 is received.

The main unit 100 also includes a mouthpiece portion 120 including an outlet 124. The mouthpiece portion is connected to the main housing 101 by a hinged connection in this example but any kind of connection may be used, such as a snap fitting or a screw fitting. One or more air inlets 122 are provided between the mouthpiece portion 120 and the main housing 101 when the mouthpiece portion is in a closed position, as shown in FIG. 1.

Within the mouthpiece portion is a flat spiral inductor coil 110. The coil 110 is formed by stamping and/or cutting a spiral coil from a sheet of copper. The coil 110 is positioned between the air inlets 122 and the air outlet 124 so that air drawn through the inlets 122 to the outlet 124 passes through the coil 110.

The cartridge 200 (shown in schematic form in FIG. 1) comprises a rigid container 204 defining a liquid storage portion 201. The liquid storage portion 201 contains a liquid aerosol-forming substrate (not shown). The container 204 of the cartridge 200 is fluid impermeable but has an open end covered by a permeable susceptor element 205 (shown in FIG. 2). The permeable susceptor element 205 comprises a ferrite mesh, comprising a ferrite steel. The aerosol-forming substrate can form a meniscus in the interstices of the mesh. When the cartridge 200 is engaged with the main unit 100 and is received in the cavity 112, the susceptor element 205 is positioned adjacent the flat spiral coil 110. The cartridge 200 may include keying features to ensure that it cannot be inserted into the main unit upside-down.

In use, a user applies a negative pressure on the mouthpiece portion 120 to draw air though the air inlets 122 into the mouthpiece portion 120 and out of the outlet 124 into the user's mouth. The main unit 100 includes a vapour draw sensor 106 in the form of a microphone, as part of the control electronics 104. A small air flow may be drawn through sensor inlet 121 past the microphone 106 and up into the mouthpiece portion 120 when a user draws vapour on the mouthpiece portion. When a vapour draw is detected, the control electronics provide a high frequency oscillating current to the coil 110. This generates an oscillating magnetic field as shown in dotted lines in FIG. 1. An LED 108 is also activated to indicate that the main unit 100 is activated. The oscillating magnetic field passes through the susceptor element 205, inducing eddy currents in the susceptor element 205. The susceptor element may heat up as a result of Joule heating and as a result of hysteresis losses, reaching a temperature sufficient to vaporize the aerosol-forming substrate close to the susceptor element. The vaporized aerosol-forming substrate may be entrained in the air flowing from the air inlets to the air outlet and cools to form an aerosol within the mouthpiece portion before entering the user's mouth. The control electronics 104 supply the oscillating current to the coil for a specific (or, alternatively, predetermined) duration, in this example five seconds, after detection of negative pressure and then switches the current off until a new negative pressure is detected.

The cartridge 200 has a circularly cylindrical shape and the susceptor element spans a circular open end of the cartridge housing; however, example embodiments are not limited thereto, and other configurations are possible. For example, the susceptor element may be a strip of steel mesh 220 that spans a rectangular opening in the cartridge container 204.

The example aerosol-generating system shown in FIG. 1 uses inductive heating. Further examples of suitable inductive heating elements and explanation of the operation of inductive heating systems are described in WO 2015/177046 A1, the entire contents of which are herein incorporated by reference.

It will be appreciated that the aerosol-generating system may comprise other types of aerosol-generating means. For example, the aerosol-generating means may comprise other aerosol-generating means configured to atomise the liquid aerosol-forming substrate by heat. The aerosol-generating means may comprise one or more resistive heating elements. The aerosol-generating means may also comprise aerosol-generating means configured to atomise the liquid aerosol-forming substrate by vibration. The aerosol-generating means may comprise one or more vibratable elements and actuators.

Figure 2:
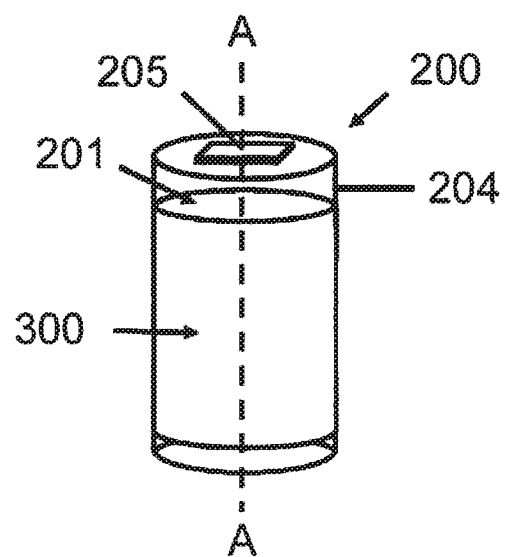
FIG. 2 shows a perspective view of a cartridge according to a first embodiment that is suitable for use in the aerosol-generating system of FIG. 1.

FIG. 2 shows a cartridge 200 in accordance with an example embodiment that is suitable for use with the main unit 100 of FIG. 1. The cartridge 200 has a housing that generally forms a circularly cylindrical container 204 defining a liquid storage portion 201 for holding liquid aerosol-forming substrate. The container 204 comprises a first end, a second end having a susceptor 205 and a tubular sidewall extending between the first and second ends. The container 204 has full rotational symmetry about a central longitudinal axis A-A.

It will be appreciated that in other example embodiments, the cartridge 200 may not be provided with a susceptor. The cartridge 200 may instead be provided with another suitable type of aerosol-generating means. For example, the cartridge 200 may be provided with a resistive heater that may be physically and electrically connected to the power supply of the main unit 100 via electrical contacts on the cartridge 200 and complimentary electrical contacts in the cavity of the main unit 100. The electrical contacts of the cartridge may come into contact with the electrical contacts of the main unit when the cartridge is received in the cavity of the main unit. In other example embodiments, the main unit 100 may comprise the aerosol-generating means and the cartridge may not comprise any part of the aerosol-generating means.

A sensor 300 circumscribes the cylindrical container 204 and extends most of the length of the container 204, substantially covering the tubular sidewall. The sensor 300 substantially forms a circularly cylindrical sleeve that substantially surrounds the sidewall of container 204.

The sensor 300 is shown in more detail in FIGS. 3 to 6. The sensor 300 generally comprises a flexible printed circuit board 310, a first pair of electrodes 320, a second pair of electrodes 330 and shielding 340.

The flexible printed circuit board 310 is generally rectangular, having a width approximately equal to the length of the container 204 of the cartridge 200 and a length approximately equal to the circumference of the container 204. The flexible printed circuit board 310 may be rolled, bent or flexed around the sidewall of the container 204 to form a close fitting sleeve around the circumference of the container 204 that substantially covers the sidewall.

In this example embodiment, the flexible printed circuit board 310 is secured to the outer surface of the sidewall of the container 204 by an adhesive layer (not shown). Securing the flexible printed circuit board to the container 204 may ensure that the close fit between the sensor 300 and the container 204 remains constant and the relative arrangement of the pairs of electrodes 320, 330 and the liquid storage portion 201 remains constant. It will be appreciated that any other suitable securing means may be used, such as clips or other types of fixings. In some example embodiments, the sensor 300 and the container 204 may be secured together by an interference or a friction fit. It will also be appreciated that in other example embodiments the sensor 300 may not be secured to the container 204, such that the container 204 may be removed from the sensor 300. In these example embodiments, the sensor 300 may be rolled around a cylindrical tube, having an inner diameter sufficient to accommodate the container 204. The cylindrical tube may substantially prevent or inhibit the sensor from being damaged on insertion and removal of the container 204.

The first and second pairs of electrodes 320, 330 are printed on a surface of the flexible printed circuit board 310 and the electrical shielding 340 is printed on an opposite surface of the flexible printed circuit board 310.

Figure 3:
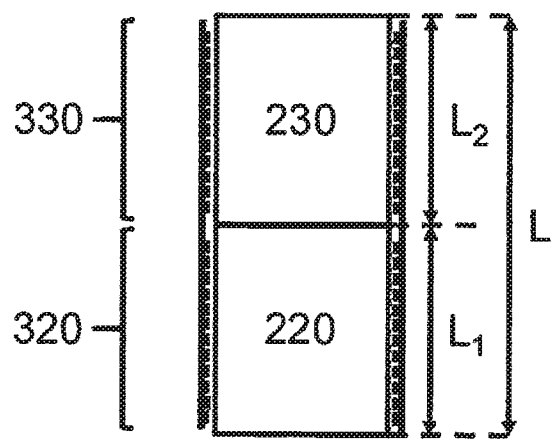
FIG. 3 shows a schematic cross-section of the cartridge of FIG. 2 through the central longitudinal axis A-A.
Figure 6:
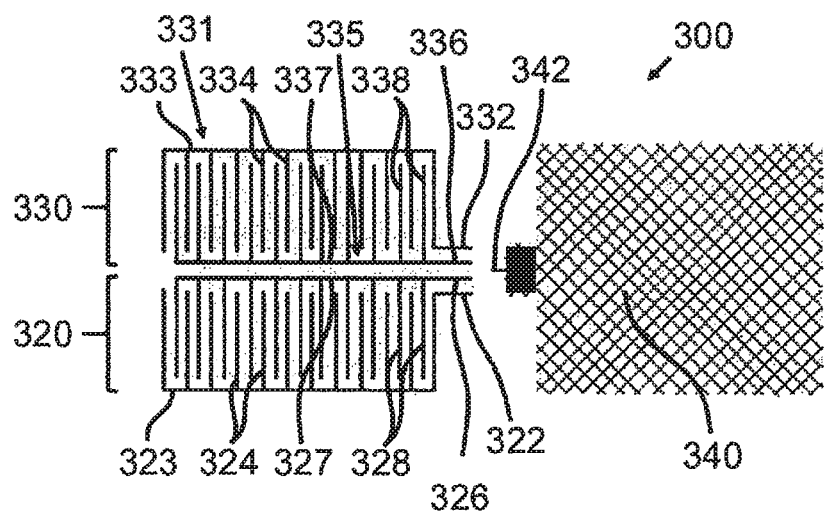
FIG. 6 shows a schematic illustration of an unfolded sensor of the cartridge of FIG. 2.

As shown in FIGS. 3 and 6, the circuit board 310 is notionally divided into two halves along its length, and each pair of electrodes 320, 330 extends over one of the halves of the surface of the flexible printed circuit board 310. The first and second pairs of electrodes 320, 330 do not overlap, such that the first pair of electrodes 320 extends over a first half of the surface of the circuit board 310 and the second pair of electrodes 330 extends over a second half of the circuit board 310.

As shown in FIG. 3, the liquid storage portion 201 is notionally divided into two identical portions, a first portion 220 and a second portion 230. The first portion 220 comprises a first half of the liquid storage portion 201 and the second portion 230 comprises a second half of the liquid storage portion 201. Liquid aerosol-forming substrate (also referred to as pre-vapour formulation) held in the liquid storage portion 201 may move between the first portion 220 and the second portion 230. Each portion 220, 230 comprises a substantially circularly cylindrical volume having a central longitudinal axis. The first and second portions 220, 230 are arranged end to end along a common central longitudinal axis A-A. The first and second portions 220, 230 are substantially symmetrical about a plane that extends between the first and second portions 220, 230 and is perpendicular to the common central longitudinal axis A-A. The first portion 220 extends from the first end of the container 204 to the plane, and has a length $L_1$, and the second portion 230 extends from the second end of the container 204 to the plane, and has a length $L_2$.

Figure 4:
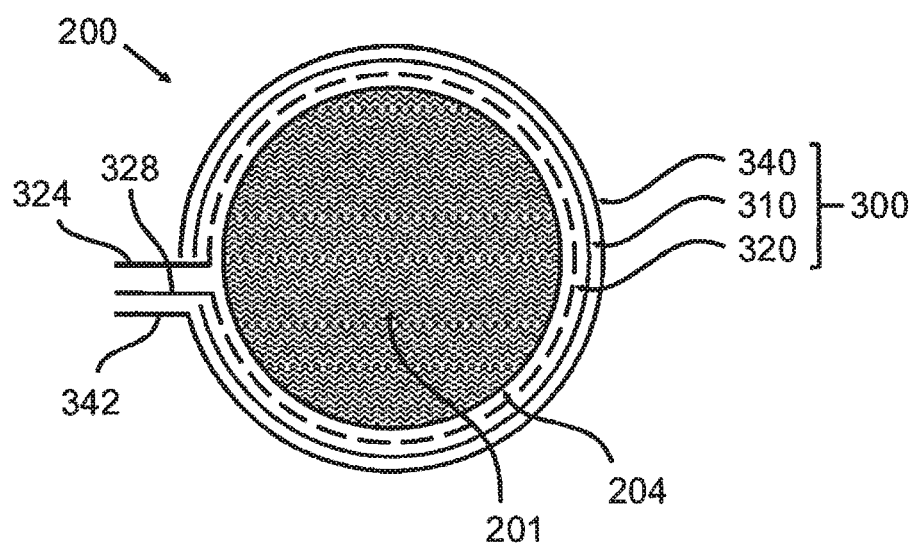
FIG. 4 shows a plan view of the cartridge of FIG. 2.
Figure 5:
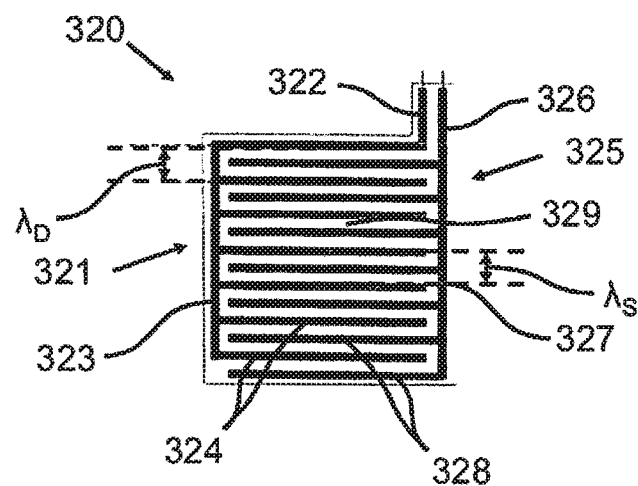
FIG. 5 shows a pair of interdigitated electrodes from a sensor of the cartridge of FIG. 2.

As shown in FIGS. 3 and 4, the sensor 300 is arranged around the container 204 such that the first and second pairs of electrodes 320, 330 face towards the container 204 and the shielding 340 faces away from the container 204. For example, the first and second pairs of electrodes are arranged adjacent to the sidewall of the container 204. The first pair of electrodes 320 is arranged to substantially surround the first portion 220 and the second pair of electrodes 330 is arranged to substantially surround the second portion 230. As such, the first pair of electrodes 320 is arranged to sense electrical properties of the first portion 220 and the second pair of electrodes is arranged to sense electrical properties of the second portion 230.

The first pair of electrodes 320 form an interdigitated sensor. For example, the first pair of electrodes are interdigitated electrodes, as shown in FIGS. 3 and 4. The first pair of electrodes 320 comprises a driving electrode 321 and a sensing electrode 325.

The driving electrode 321 comprises a connector 322 for connecting the sensor to a control system of a main unit 100, a main track or spine 323 connected to the connector 322 and a plurality of protrusions or fingers 324 extending from main track 323. The main track 323 and the fingers 324 form a comb-like structure that is regular or periodic. The regular spacing of the fingers 324 along the main track 323 provides gaps 329 between successive or adjacent fingers 324. The distance between the centrelines of successive or adjacent fingers 324 is referred to as the band gap $\lambda$, of the electrode 321.

The sensing electrode 325 also comprises a connector 326, a main track or spine 327 connected to the connector 326 and a plurality of protrusions or fingers 328 extending from main track 323. The main track 327 and the fingers 328 form a comb-like structure similar to that of the driving electrode 321. The band gap $\lambda_s$ of the sensing electrode 325 is equal to the band gap $\lambda_D$ of the driving electrode 321.

The driving electrode 321 and the sensing electrode 325 are arranged on the surface of the printed circuit board 310 such that the main tracks 323, 327 extend substantially in the direction of the length of the circuit board 310 and the fingers 324, 328 extend substantially in the direction of the width of the board 310. The fingers 324 of the driving electrode 321 may extend towards the main track 327 of the sensing electrode 325 and the fingers 328 of the sensing electrode 325 extend towards the main track 323 of the driving electrode 321. The fingers 324 of the driving electrode 321 may extend into the gaps 329 between adjacent fingers 328 of the sensing electrode 325 and the fingers 328 of the sensing electrode extend into the gaps 329 between adjacent fingers 324 of the driving electrode 321. As such, the driving electrode 321 and the sensing electrode 325 are interdigitated. The lengths and widths of the fingers 324, 328 of the driving and sensing electrodes 321, 325 are chosen such that a substantially constant gap or spacing is provided between the driving and sensing electrodes 321, 325 along the lengths of the electrodes. The first pair of interdigitated electrodes 320 cover substantially the first half of the surface of the printed circuit boards 310.

The second pair of electrodes 330 may also be interdigitated electrodes that form an interdigitated sensor. The second pair of electrodes 330 are identical, or substantially identical, to the first pair of electrodes 320.

The second pair of electrodes 330 comprise a driving electrode 331 having a connector 332, a substantially linear main track 333 and substantially linear fingers 334 extending from the main track 333. The second pair of electrodes 330 also comprise a sensing electrode 335 having a connector 336, a substantially linear main track 337 and substantially linear fingers 338 extending from the main track 337.

The second pair of electrodes 330 are arranged on the circuit board 310 similarly to the first pair of electrodes 320, but substantially cover the second half of the surface of the board 310, rather than the first half.

Shielding 340 is provided on the other surface of the printed circuit board 310. The shielding comprises an electrically conductive mesh that is printed on the other surface of the board 310, substantially opposite the first and second pairs of electrodes 320, 330. The conductive mesh is electrically connected to ground via a connector 342.

Figure 7:
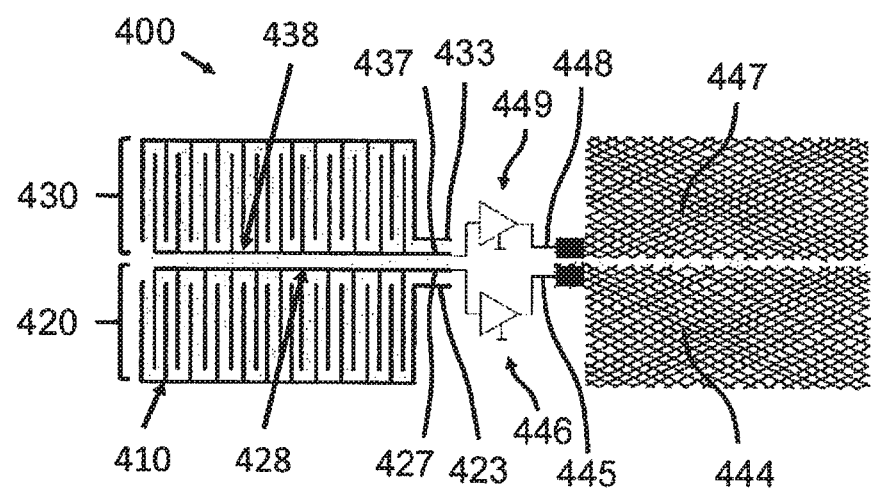
FIG. 7 shows a schematic illustration of an unfolded sensor according to another example embodiment.

FIG. 7 shows a sensor 400 according to another example embodiment.

The sensor shown in FIG. 7 comprises a printed circuit board 410 and first and second pairs of interdigitated electrodes 420, 430 that are identical to the printed circuit board 310 and the first and second pairs of interdigitated electrodes 320, 330 of the sensor 300. However, the sensor 400 comprises a different configuration for the shielding 440. The shielding 440 comprises a first conductive mesh 444 extending over the first half of the other surface of the circuit board, directly opposite the first pair of electrodes 420. The first mesh 444 comprises a connector 445 that is electrically connected to the sensing electrode 428 of the first pair of electrodes 420. The shielding 440 also comprises a second conductive mesh 447 extending over the second half of the other surface of the circuit board 410, directly opposite the second pair of electrodes 430. The second mesh 447 comprises a connector 448 that is electrically connected to the sensing electrode 438 of the second pair of electrodes 430. The first conductive mesh 444 and the second conductive mesh 447 are not electrically connected. This configuration removes the effects of any parasitic capacitance between the first and second pairs of electrodes and the shielding.

Turning back to the sensor 300 of FIG. 6, the connectors 322, 326, 332, 336 may be electrically connected to a control system of a main unit, such as the main unit 100. The control system 104 may comprise any suitable means for measuring the capacitance between the first pair of electrodes 320 and for measuring the capacitance between the second pair of electrodes 330. In this example embodiment, the control system 104 includes circuitry having a switched capacitor amplifier or integrator. The control system 104 may be implemented in hardware, such as an integrated circuit, or in a combination of hardware and software. The integrated circuit may include the switched capacitor and/or the integrator. When implemented in a combination of hardware and software, the hardware may include a memory storing, in a non-transitory manner, machine-readable instructions. The control system 104 may include a processor capable of executing the machine-readable instructions to perform the functions of the control unit 104. The processor may be or may include one or more of a microprocessor, a CPU, a DSP, an ASIC, an SoC, an FPGA, and/or the like.

The control system may be programmed to determine the orientation of the liquid storage portion based on measurements of the capacitance between the first pair of electrodes 320 and measurements of the capacitance between the second pair of electrodes 330. In particular, the control system may be programmed to determine whether the liquid storage portion 201 is at a horizontal orientation using measurements of the capacitance between the first and second pairs of electrodes 320, 330.

Figure 8A:
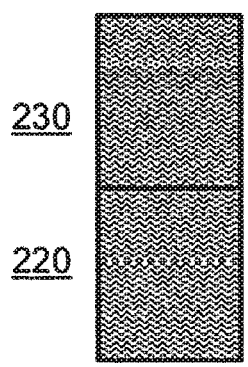
FIGS. 8a, 8b, 8c and 8d show schematic illustrations of the cartridge of FIG. 2 holding different amounts of liquid aerosol-forming substrate in upright vertical and horizontal orientations.
Figure 8B:
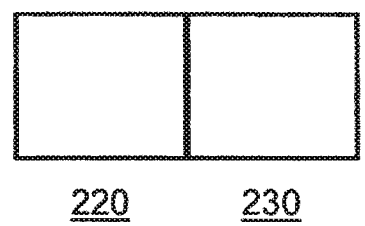

FIG. 8a shows the cartridge 200 full of liquid aerosol-forming substrate and oriented in an upright vertical orientation. The cartridge 200 is considered to be in a vertical orientation when the central longitudinal axis A-A is substantially vertical. The cartridge 200 is determined to be upright when the first portion 220 is arranged directly below the second portion 230. FIG. 8b shows the cartridge 200 empty of liquid aerosol-forming substrate and oriented in a horizontal orientation. The cartridge 200 is considered to be in a horizontal orientation when the central longitudinal axis A-A is substantially horizontal.

When the liquid storage portion 201 is full or empty of liquid aerosol-forming substrate, measuring the orientation of the liquid storage portion using measurements between the first and second pairs of electrodes 320, 330 may not be possible. This may be because the ratio of air and liquid aerosol-forming substrate held in the first and second portions 220, 230 of the liquid storage portion 201 does not change when the orientation of the liquid storage portion changes.

When the liquid storage portion 201 is full of liquid aerosol-forming substrate, the capacitance measured between the first pair of electrodes 320 is equal to a maximum reference value and the capacitance measured between the second pair of electrodes 330 is equal to the maximum reference value. When the liquid storage portion 201 is empty of liquid aerosol-forming substrate, the capacitance measured between the first pair of electrodes 320 is equal to the minimum reference value and the capacitance measured between the second pair of electrodes 330 is equal to the minimum reference value.

Figure 8C:
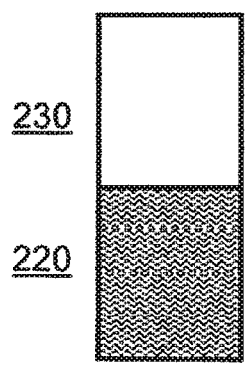
Figure 8D:
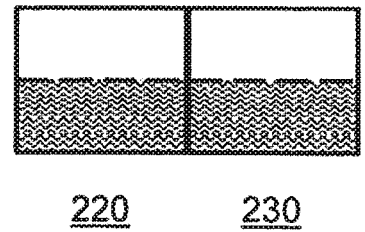

FIG. 8c shows the cartridge 200 half filled with liquid aerosol-forming substrate and oriented in an upright vertical orientation. FIG. 8d shows the cartridge 200 half filled with liquid aerosol-forming substrate and oriented in a horizontal orientation. FIGS. 8c and 8d show that although the amount of liquid aerosol-forming substrate held in the liquid storage portion 201 is the same in both Figures, the amount of liquid aerosol-forming substrate held in the first and second portions 220, 230 of the liquid storage portion 201 changes with the orientation of the liquid storage portion 201.

When the liquid storage portion 201 is vertical and upright, as shown in FIG. 8c, the first portion 220 is filled with liquid aerosol-forming substrate and the second portion 230 is empty. When the liquid storage portion 201 is horizontal, as shown in FIG. 8d, the first portion 220 is half filled with liquid aerosol-forming substrate and the second portion 230 is half filled with liquid aerosol-forming substrate.

The control system may be programmed to determine that the liquid storage portion 201 is at a horizontal orientation when the capacitances measured between the first and second pairs of electrodes 320, 330 are substantially equal, when the capacitances measured between the first and second pairs of electrodes 320, 330 are less than a maximum reference value stored by the control system and when the capacitances measured between the first and second pairs of electrodes 320, 330 are greater than a minimum reference value stored by the control system.

The maximum reference value may correspond to a measurement of capacitance of the first or second pairs of electrodes when the liquid storage portion 201 is filled with liquid aerosol-forming substrate. The minimum reference value may correspond to a measurement of capacitance of the first or second pair of electrodes when the liquid storage portion 201 is empty of liquid aerosol-forming substrate. In this example embodiment, since the first and second portions 220 and 230 are identical, or substantially identical, the maximum reference values may be the same for the first and second pairs of electrodes and the minimum reference values may be the same for the first and second pairs of electrodes. However, other example embodiments the first and second pairs of electrodes may have different maximum and minimum reference values, and example embodiments are not limited thereto.

As mentioned above, pairs of interdigitated electrodes generate an electrical field that has a limited penetration depth. As a result, pairs of interdigitated electrodes tend to sense the presence or absence of liquid aerosol-forming substrate at the sidewall of the liquid storage portion. The proportion or fraction of the surface of the sidewalls that is covered by liquid aerosol-forming substrate for a given amount of liquid aerosol-forming substrate depends on the shape of the liquid storage portion.

Figure 9:
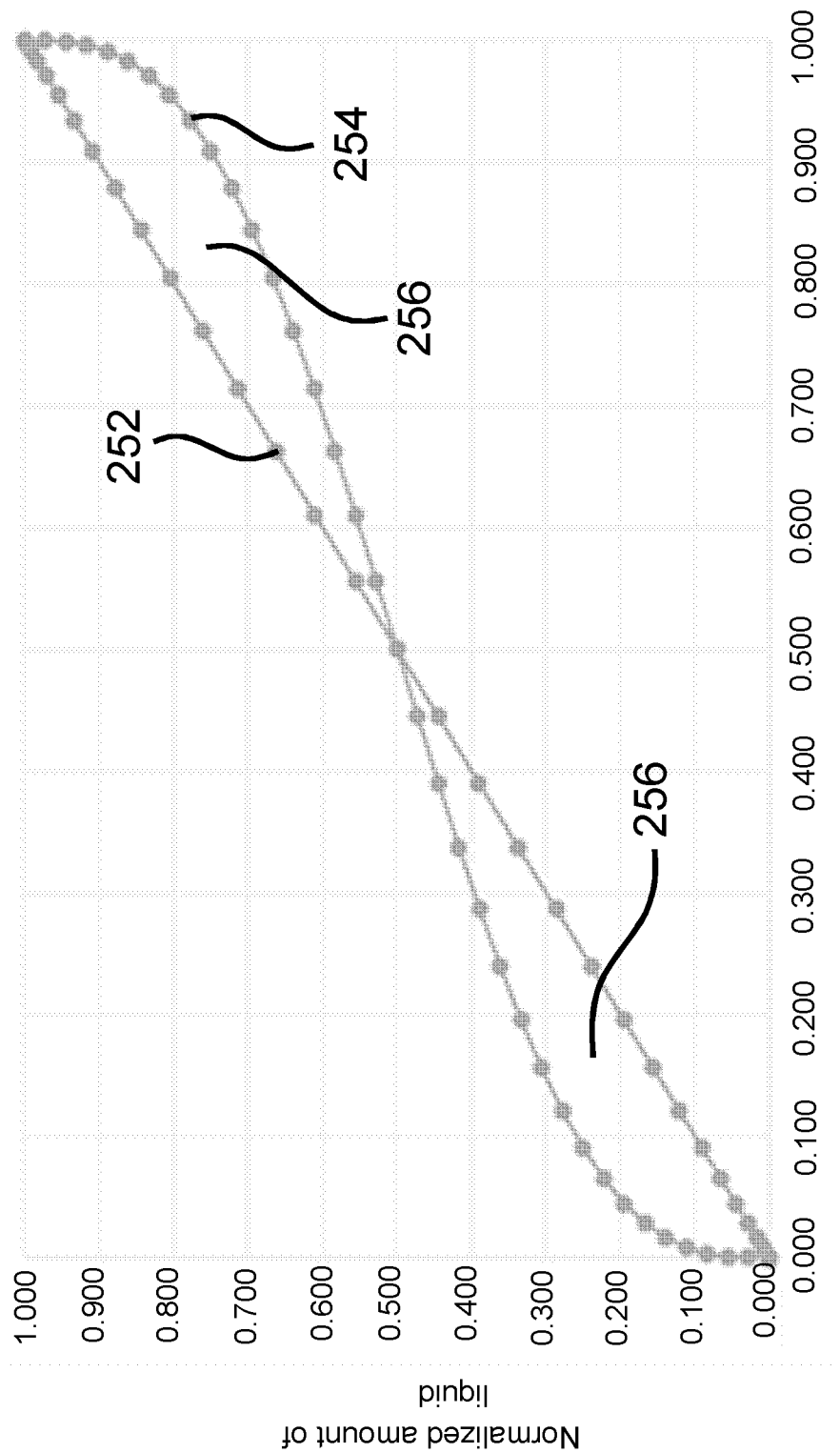
FIG. 9 shows a normalized graph of the wetted surface of the walls of the liquid storage portion walls versus the amount of liquid aerosol-forming substrate held in the liquid storage portion of the cartridge of FIG. 2.

The liquid storage portion 201 is substantially cylindrical, being defined by the cylindrical container 204. FIG. 9 shows the relationship 254 between the normalized surface covered by liquid aerosol-forming substrate (i.e. 0 corresponds to none of the surfaces being covered by liquid and 1 corresponds to all of the surfaces being covered by liquid) and the normalized amount of liquid aerosol-forming substrate held in the liquid storage portion (i.e. 0 corresponds to the liquid storage portion being empty of liquid and 1 corresponds to the liquid storage portion being full of liquid) for the cylindrical liquid storage portion 201.

As shown in FIG. 9, when the liquid storage portion is vertical, the relationship 254 between the wetted surfaces and the amount of liquid in the liquid storage portion is linear 252. This may be because the cross-section of the liquid storage portion is uniform along the central longitudinal axis. Also as shown in FIG. 9, when the liquid storage portion is horizontal, the relationship 254 between the wetted surfaces and the amount of liquid in the liquid storage portion is not linear. The relationship 254 between the wetted surfaces and the amount of liquid in the liquid storage portion may be known for the liquid storage portion when the liquid storage portion is in a horizontal and a vertical orientation. These relationships may be known and stored in a memory of the control system, such that the control system may use the relationship to accurately determine the amount of liquid aerosol-forming substrate that is held in the liquid storage portion when the liquid storage portion is determined to be either at a horizontal or a vertical orientation.

When the liquid storage portion is neither at a vertical nor a horizontal orientation, the relationship 254 between the wetted surfaces and the amount of liquid in the liquid storage portion may not be known and may fall within the region 256 of the graph of FIG. 9. As a result, determinations of the amount of liquid aerosol-forming substrate that is held in the liquid storage portion may be less accurate if the determination is made when the liquid storage portion is not at a horizontal or a vertical orientation.

Figure 10A:
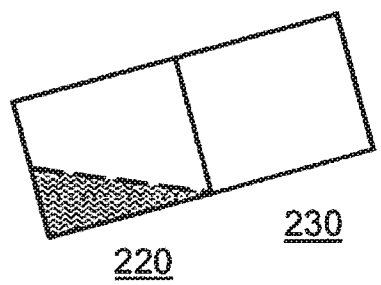
FIGS. 10a, 10b and 10c show schematic illustrations of the cartridge of FIG. 2 holding different amounts of liquid aerosol-forming substrate in an inclined or tilted orientation.
Figure 10B:
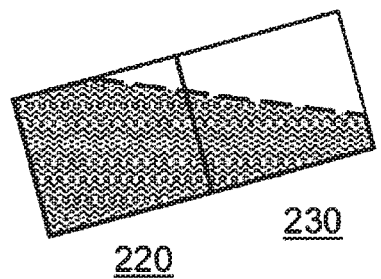
Figure 10C:
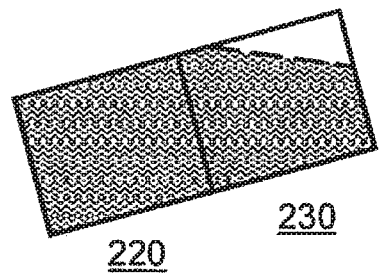
Figure 13:
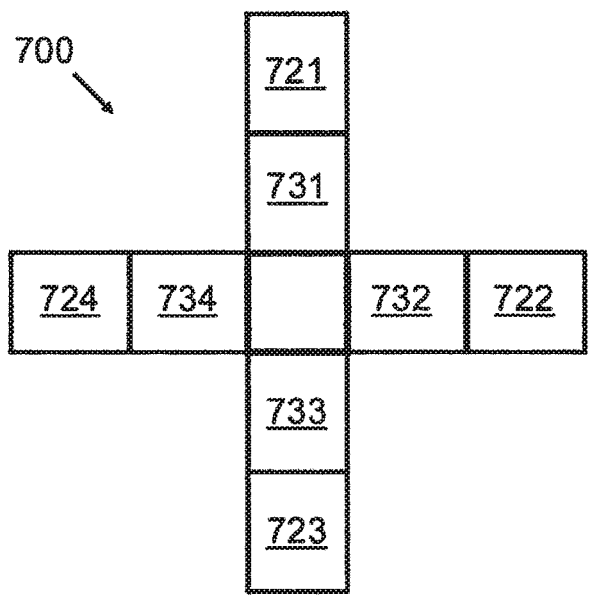
FIG. 13 shows a plan view of an unfolded sensor according to another example embodiment.
Figure 14:
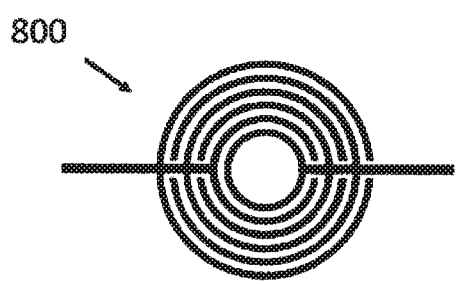
FIG. 14 shows a schematic illustration of a pair of interdigitated electrodes of an alternative example embodiment.
Figures 15A, 15B, 15C:
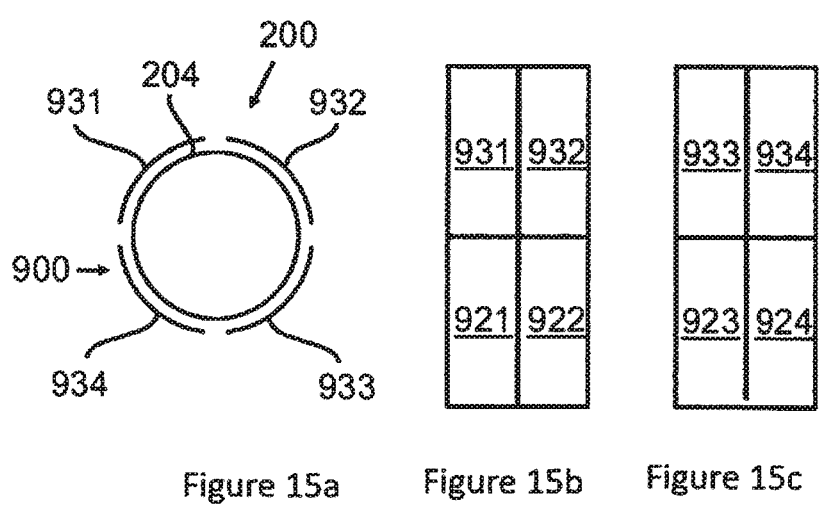
FIGS. 15a, 15b and 15c show a plan view, a schematic front illustration and a schematic back illustration respectively of a further embodiment of a cartridge according to example embodiments that is suitable for use in the aerosol-generating system of FIG. 1.

FIGS. 10a, 10b and 10c show the cartridge 200 at a tilted or an inclined orientation that is neither horizontal nor vertical. FIG. 10a shows the liquid storage portion holding a small amount of liquid aerosol-forming substrate, FIG. 10b shows the liquid storage portion half filled with liquid aerosol-forming substrate and FIG. 10c shows the liquid storage portion that is over half filled with liquid aerosol-forming substrate.

At the orientations shown in FIGS. 10a, 10b and 10c, the relationship 254 between the wetted surfaces of the liquid storage portion and the amount held in the liquid storage portion is within the region 256 of the graph of FIG. 9. As such, it is not possible to determine the amount of liquid aerosol-forming substrate held in the liquid storage portion using the relationships 252, 254 shown in the graph of FIG. 9.

The control system may be programmed to determine that the liquid storage portion is not at a horizontal orientation, because a comparison of measurements of the capacitance of the first pair of electrodes and measurements of the capacitance of the second pair of electrodes are not equal.

For the situation depicted in FIG. 10a, the control system may be programmed to determine that the liquid storage portion comprises a small amount of liquid aerosol-forming substrate, as the capacitance of the second pair of electrodes 330 indicates that the second portion 230 is empty but the capacitance of the first pair of electrodes 320 indicates that the first portion 220 is neither full nor empty of liquid aerosol-forming substrate. In this situation, the control system may be programmed to indicate to a user that the amount of liquid aerosol-forming substrate is low and that the liquid storage portion should be rotated into a horizontal orientation so that a determination of the amount of liquid aerosol-forming substrate held in the liquid storage portion may be made. In particular for a small amount of liquid aerosol-forming substrate, the accuracy of the determination is significantly greater when the liquid storage portion is at a horizontal orientation than when the liquid storage portion is at a vertical orientation. This may be because the wetted surface is much greater when the liquid storage portion is horizontal than when the liquid storage portion is vertical.

When the liquid storage portion is rotated to a horizontal orientation and the determination of the amount of liquid in the liquid storage portion has been made, the control system may be programmed to prevent or inhibit operation of the aerosol-generating system if the determined amount is below a specific (or, alternatively, predetermined) threshold, typically between 1 percent and 5 percent of the volume of the liquid storage portion.

For the situations depicted in FIGS. 10b and 10c, the control system may be configured to determine that the liquid storage portion is at least half full of liquid aerosol-forming substrate, as the capacitances of the second pair of electrodes indicate that the second portion 230 is neither full nor empty of liquid aerosol-forming substrate. In particular, for the situation depicted in FIG. 10c, the control system may be configured to determine that the liquid storage portion is almost full of liquid aerosol-forming substrate as the capacitance of the first pair of electrodes indicates that the first portion 220 is full of liquid aerosol-forming substrate.

FIGS. 11a and 11b show a cartridge 200 according to another example embodiment. The cartridge 200 is identical to the cartridge 200 of FIGS. 2 to 10 and comprises a sensor 500. The sensor 500 is substantially similar to the sensors 300 and 400 described above, but comprises two pairs of first electrodes 521, 522 and two pairs of second electrodes 531, 532. One of the pairs of first electrodes 521 circumscribes substantially half of the circumference of the first portion 220 of the liquid storage portion 201 and the other of the pairs of first electrodes 522 circumscribes substantially the other half of the first portion 220 of the liquid storage portion 201. Similarly, one of the pairs of second electrodes 531 circumscribes substantially half of the circumference of the second portion 230 of the liquid storage portion 201 and the other of the pairs of first electrodes 532 circumscribes substantially the other half of the second portion 230 of the liquid storage portion 201.

Providing separate sensors, or separate pairs of interdigitated electrodes at different sides of the first and second portions 220, 230 of the liquid storage portion may enable a control system to provide an improved determination of whether the liquid storage portion is at vertical orientation. This arrangement of sensors may enable a control system to determine when the liquid storage portion 201 is at a horizontal orientation and when the liquid storage portion is at a vertical orientation.

When the sum of the capacitances of the first pairs of electrodes 521, 522 is equal to the sum of the capacitances between the second pairs of electrodes 531, 532, the liquid storage portion 201 may be determined to be at a horizontal orientation.

When the capacitance of the first pair of electrodes 521 at the first side of the liquid storage portion 201 is equal to the capacitance of the second pair of electrodes 531 at the first side of the liquid storage portion 201, and the capacitance of the first pair of electrodes 522 at the second side of the liquid storage portion 201 is equal to the capacitance of the second pair of electrodes 532 at the second side of the liquid storage portion 201, the liquid storage portion is at a vertical orientation.

A control system of a main unit, such as the main unit 100, may be configured to combine the capacitances measured between each of the first pairs of electrodes and to combine the capacitances measured between each of the second pairs of electrodes. The control system may be configured to determine that the liquid storage portion is at a horizontal orientation if the combined capacitances of the first pairs of electrodes are substantially equal to the combined capacitances of the second pairs of electrodes.

The control system may be configured to compare the capacitances measured between each of the first pairs of electrodes and to compare the capacitances measured between each of the second pairs of electrodes. The control system may be configured to determine that the liquid storage portion is at a vertical orientation if the capacitances of the first pairs of electrodes are substantially equal and if the capacitances of the second pairs of electrodes are substantially equal.

The control system may further be configured to determine the amount of liquid aerosol-forming substrate that is held in the liquid storage person if the control system determines that the liquid storage portion is at either a horizontal orientation or a vertical orientation. This may improve the reliability of the determination.

In some example embodiments, the main unit comprises indication means for providing a visual, haptic or audible indications to the user. The control system may be configured to provide an indication to a user at various times, for example, when the liquid storage portion is determined to be at a horizontal orientation, when the liquid storage portion is determined to be at a non-horizontal orientation and when the determined amount of liquid aerosol-forming substrate is at or below a threshold. In some example embodiments the main unit may prevent or inhibit further aerosol-generation on determination that the amount of liquid aerosol-forming substrate is at or below the threshold.

In some example embodiments, the control system may be configured to count vapour draws taken by a user on the aerosol-generating system and may be configured to adjust the determined amount value based on the number of vapour draws detected.

It will be appreciated that the liquid storage portion may have any other suitable shape. Suitable shapes are shapes that have a uniform cross-section along the central longitudinal axis of the liquid storage portion. For example, the liquid storage portion may have a cross-section that is circular, triangular or rectangular.

FIGS. 12*a*, 12*b* and 12*c* show a cartridge 200 according to another example embodiment. The cartridge 200 is identical to the cartridge 200 of FIGS. 2 to 10 and comprises a sensor 600. The sensor 600 is substantially similar to the sensor 500 described above, but comprises four pairs of first electrodes 621, 622, 623, 624 and four pairs of second electrodes 631, 632, 633, 634. Each of the pairs of first electrodes 621, 622, 623, 624 circumscribes substantially a quarter of the circumference of the first portion of the liquid storage portion 201. Similarly, each of the pairs of second electrodes 631, 632, 633, 634 circumscribes substantially a quarter of the circumference of the second portion of the liquid storage portion 201. This arrangement may further improve the determination of the orientation of the liquid storage portion by providing the control system with further indications of the specific locations on the surfaces of the container 204 that are wetted with liquid aerosol-forming substrate.

FIG. 13 shows a sensor 700 according to another example embodiment. The sensor 700 is configured to be arranged adjacent to a liquid storage portion comprising a container that has a substantially rectangular cuboid shape. The sensor 700 comprises a printed circuit board having four arms connected at a central portion and arranged substantially in a cross shape. Each of the arms is intended to cover a side wall of the cuboid container.

The sensor 700 comprises four first pairs of interdigitated electrodes 721, 722, 723, 724 and four second pairs of interdigitated electrodes 731, 732, 733, 734. Each arm of the printed circuit board comprises a first pair of interdigitated electrodes arranged towards a distal end of the arm and a second pair of interdigitated electrodes arranged towards a proximal end of the arm, towards the central portion. As such, a first pair of interdigitated electrodes and a second pair of interdigitated electrodes will be arranged at each side face of the cuboid container of the liquid storage portion.

To install the sensor 700 on a cuboid container of a liquid storage portion, the central section of the circuit board may be arranged at an end of the liquid storage portion and each arm of the circuit board may be folded or bent onto a side wall of the container. This configuration may be relatively inexpensive to manufacture and may provide improved location of the first pairs of electrodes with the first portion of the liquid storage portion and the second pairs of electrodes with the second portion of the liquid storage portion.

FIG. 14 shows another arrangement of a pair of interdigitated electrodes 800 that may be suitable for use in example embodiments. The pair of interdigitated electrodes 800 comprises a driving electrode and a sensing electrode. Each electrode comprises a substantially linear main track or spine and a plurality of pairs of arcuate protrusions or fingers. The pairs of arcuate fingers are spaced regularly along the main track and extend in opposite directions away from the main track. Each pair of fingers forms an incomplete circle that is not joined at the distal end. Adjacent pairs of protrusions are spaced apart by gaps defining the band gap of the electrode. The arcuate pairs of fingers of the driving electrode are arranged in the gaps between the pairs of arcuate fingers of the sensing electrode such that the fingers of the driving and sensing electrodes are interdigitated.

FIGS. 15*a*, 15*b* and 15*c* show a cartridge 200 according to another example embodiment. The cartridge 200 is identical to the cartridge 200 of FIGS. 2 to 10 and comprises a sensor 900. The sensor 900 is substantially similar to the sensor 600 described above with reference to FIG. 12. However, the sensor 900 does not comprise pairs of interdigitated electrodes.

The sensor 900 comprises two first pairs of electrodes 921, 922, 923, 924 and two second pairs of electrodes 931, 932, 933, 934. As mentioned above, in this example embodiment the first and second pairs of electrodes are not interdigitated electrodes, but rather are plate electrodes arranged at opposite sides of the liquid storage portion 201 of the container 204, such that a portion of the liquid storage portion are arranged between each of the pairs of electrodes.

Each electrode 921, 922, 931, 932 comprises a curved plate that extends about half the length of the container 204 and circumscribes about a quarter of the circumference of the container 204. Each of the first plate electrodes 921, 922, 923, 924 circumscribes substantially a quarter of the circumference of the first portion of the liquid storage portion 201. Similarly, each of the second plate electrodes 931, 932, 933, 934 circumscribes substantially a quarter of the circumference of the second portion of the liquid storage portion 201.

Each electrode 921, 922, 931, 932 comprises a curved plate that extends about half the length of the container 204 and circumscribes about a quarter of the circumference of the container 204. The first pairs of electrodes 921, 922, 923, 924 substantially surround the first portion 220 of the liquid storage portion 201 and the second pairs of electrodes 931, 932, 933, 934 substantially surround the second portion 230 of the liquid storage portion 201. As such, the first portion 220 of the liquid storage portion 201 is arranged between the first pairs of electrodes 921, 922, 923, 924 and the second portion 230 of the liquid storage portion 201 is arranged between the second pairs of electrodes 931, 932, 933, 934.

Each first pair of electrodes may form a first capacitor and the first portion 220 of the liquid storage portion 201 may form the dielectric of the first capacitors. Similarly, each second pairs of electrodes may form a second capacitor and the second portion 230 of the liquid storage portion 201 may form the dielectric of the second capacitor.

A control system may determine the orientation of the liquid storage portion 201 based on measurements of the capacitance of the first pairs of electrodes and measurements of capacitance of the second pairs of electrodes in a similar manner to the control systems described above, determining the orientation of the liquid storage portion based on measurements of electrical quantities from pairs of interdigitated electrodes.

It will be appreciated that in other example embodiments, the cartridges described in relation to FIGS. 1 to 15 may not be cartridges, but rather may be integral parts of main units, such as the main unit shown in FIG. 1.

It will be appreciated that any features that are described above in one embodiment may also be provided in any of the other example embodiments. In particular, it will be appreciated that cartridges and main units according to example embodiments may comprise one or more first pairs of electrodes and one or more second pairs of electrodes. It will also be appreciated that the size and shape of the liquid storage portions and first and second pairs of electrodes may vary.

The invention claimed is:

1. An aerosol-generating system comprising:
   a liquid storage configured to hold a liquid aerosol-forming substrate, the liquid storage including a first portion in fluid communication with a second portion;
   a first pair of electrodes adjacent to or in the first portion of the liquid storage;
   a second pair of electrodes adjacent to or in the second portion of the liquid storage; and
   a control system configured to,
   measure an electrical quantity between the first pair of electrodes,
   measure an electrical quantity between the second pair of electrodes, and
   determine an orientation of the liquid storage based on the electrical quantity between the first pair of electrodes and the electrical quantity between the second pair of electrodes,
   wherein the first pair of electrodes are configured to form a first capacitor and the electrical quantity to be measured between the first pair of electrodes is a first capacitance, and wherein the second pair of electrodes are configured to form a second capacitor and the electrical quantity to be measured between the second pair of electrodes is a second capacitance.

2. The aerosol-generating system of claim 1, wherein the control system is configured to determine the orientation of the liquid storage based on a comparison between the electrical quantity between the first pair of electrodes and the electrical quantity between the second pair of electrodes.

3. The aerosol-generating system of claim 1, wherein the control system is further configured to determine an amount of the liquid aerosol-forming substrate held in the liquid storage based on the electrical quantity between the first pair of electrodes, the electrical quantity between the second pair of electrodes, and the determined orientation of the liquid storage.

4. The aerosol-generating system of claim 1, wherein the control system is configured to:
   compare the determined orientation of the liquid storage to one or more reference orientation values; and
   in response to the determined orientation of the liquid storage matching a reference orientation value, determine an amount of the liquid aerosol-forming substrate held in the liquid storage based on measurements of the electrical quantity between the first pair of electrodes and measurements of the electrical quantity between the second pair of electrodes.

5. The aerosol-generating system of claim 1, wherein the control system is configured to determine whether the liquid storage is at a horizontal orientation.

6. The aerosol-generating system according to of claim 1, wherein:
   the first portion of the liquid storage has a length and the first pair of electrodes extends the length of the first portion of the liquid storage; and
   the second portion of the liquid storage has a length and the second pair of electrodes extends the length of the second portion of the liquid storage.

7. The aerosol-generating system of claim 6, wherein:
   the first portion of the liquid storage has a uniform cross-section along the length of the first portion; and
   the second portion of the liquid storage has a uniform cross-section along the length of the second portion.

8. The aerosol-generating system of claim 1, wherein the first portion of the liquid storage comprises a first half of the liquid storage and the second portion of the liquid storage comprises a second half of the liquid storage.

9. The aerosol-generating system of claim 1, wherein at least one of:
   the first pair of electrodes are arranged such that at least a part of the first portion of the liquid storage is between the first pair of electrodes; and
   the second pair of electrodes are arranged such that at least a part of the second portion of the liquid storage is between the second pair of electrodes.

10. The aerosol-generating system of claim 1, wherein at least one of:
    the first pair of electrodes are interdigitated electrodes; and
    the second pair of electrodes are interdigitated electrodes.

11. An aerosol-generating system comprising:
    two or more first pairs of electrodes adjacent to or in a first portion of a liquid storage; and
    two or more second pairs of electrodes adjacent to or in a second portion of the liquid storage; and
    a control system configured to;
    measure an electrical quantity between each first pair of electrodes,
    measure an electrical quantity between each second pair of electrodes, and
    determine an orientation of the liquid storage based on electrical quantities between the first pairs of electrodes and electrical quantities between the second pairs of electrodes,
    wherein the first pair of electrodes are configured to form a first capacitor and the electrical quantity to be measured between the first pair of electrodes is a first capacitance, and wherein the second pair of electrodes are configured to form a second capacitor and the electrical quantity to be measured between the second pair of electrodes is a second capacitance.

12. The aerosol-generating system of claim 1, further comprising:
    a cartridge comprising the liquid storage; and
    a main unit comprising the control system and a cavity configured to receive the cartridge,
    wherein the first pair of electrodes and the second pair of electrodes are in the cartridge or in the cavity of the main unit.

13. The aerosol-generating system of claim 1, further comprising:
a main unit, wherein the main unit includes,
the control system, and
a cavity configured to receive a cartridge, wherein
the first pair of electrodes are at a first portion of the cavity such that the first portion of the liquid storage is adjacent to the first pair of electrodes when the cartridge is in the cavity, and
the second pair of electrodes are at a second portion of the cavity such that the second portion of the liquid storage of the cartridge is adjacent to the second pair of electrodes when the cartridge is in the cavity.

14. The aerosol-generating system of claim 1, further comprising:
a cartridge, wherein the cartridge includes,
the liquid storage having the first and second portions,
the first pair of electrodes adjacent to or in the first portion of the liquid storage, and
the second pair of electrodes adjacent to or in the second portion of the liquid storage.

15. A method of determining an orientation of a liquid storage of an aerosol-generating system comprising:
measuring an electrical quantity between a first pair of electrodes adjacent to or in a first portion of the liquid storage;
measuring an electrical quantity between a second pair of electrodes adjacent to or in a second portion of the liquid storage, the first portion of the liquid storage being in fluid communication with the second portion of the liquid storage; and
determining the orientation of the liquid storage based on the electrical quantity between the first pair of electrodes and the electrical quantity between the second pair of electrodes,
wherein the first pair of electrodes are configured to form a first capacitor and the electrical quantity to be measured between the first pair of electrodes is a first capacitance, and wherein the second pair of electrodes are configured to form a second capacitor and the electrical quantity to be measured between the second pair of electrodes is a second capacitance.

16. The aerosol-generating system of claim 1, further comprising:
one or more heating wires encircling a portion of one or more capillary wicks, the one or more heating wires configured to heat the liquid aerosol-forming substrate.

17. The aerosol-generating system of claim 1, wherein the measuring the electrical quantity between the first pair of electrodes includes measuring an electrical resistance between a driving interdigitated electrode of the first pair of electrodes and a sensing interdigitated electrode of the first pair of electrodes, and
the measuring the electrical quantity between the second pair of electrodes includes measuring an electrical resistance between a driving interdigitated electrode of the second pair of electrodes and a sensing interdigitated electrode of the second pair of electrodes.

18. The aerosol-generating system of claim 17, wherein a band gap between the driving interdigitaded electrode of the first pair of electrodes and the sensing interdigitaded electrode of the first pair of electrodes is between 0.5 mm and 15 mm.

* * * * *